United States Patent
Fan et al.

(10) Patent No.: US 12,302,029 B2
(45) Date of Patent: May 13, 2025

(54) METHOD FOR PROCESSING MEDIA DATA, CLIENT, AND SERVER

(71) Applicant: Huawei Technologies Co., Ltd., Shenzhen (CN)

(72) Inventors: Yuqun Fan, Shenzhen (CN); Peiyun Di, Shenzhen (CN); Ye-Kui Wang, Santa Clara, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 711 days.

(21) Appl. No.: 17/214,056

(22) Filed: Mar. 26, 2021

(65) Prior Publication Data

US 2021/0218908 A1 Jul. 15, 2021

Related U.S. Application Data

(63) Continuation of application No. PCT/CN2018/125807, filed on Dec. 29, 2018.

(60) Provisional application No. 62/737,892, filed on Sep. 27, 2018.

(51) Int. Cl.
| | |
|---|---|
| *H04N 5/272* | (2006.01) |
| *H04N 13/178* | (2018.01) |
| *H04N 13/183* | (2018.01) |
| *H04N 21/431* | (2011.01) |
| *G06F 3/01* | (2006.01) |
| *G06F 3/04842* | (2022.01) |

(52) U.S. Cl.
CPC .......... *H04N 5/272* (2013.01); *H04N 13/178* (2018.05); *H04N 13/183* (2018.05); *H04N 21/4312* (2013.01); *G06F 3/013* (2013.01); *G06F 3/04842* (2013.01)

(58) Field of Classification Search
None
See application file for complete search history.

(56) References Cited

U.S. PATENT DOCUMENTS

| | | |
|---|---|---|
| 10,123,027 B2 | 11/2018 | Hannuksela et al. |
| 10,412,422 B2 | 9/2019 | Hwang et al. |
| 10,721,530 B2 | 7/2020 | Van Brandenburg et al. |

(Continued)

FOREIGN PATENT DOCUMENTS

| | | |
|---|---|---|
| CN | 102160084 A | 8/2011 |
| CN | 102981695 A | 3/2013 |

(Continued)

OTHER PUBLICATIONS

"WD ISO/EC 23090-2 2nd Edition OMAF", 123.MPEG Meeting; Jul. 16, 2018-Jul. 20, 2018; Ljubljana; Motion Picture Expert Group, ISO/IEC JTC1/SC29/WG1 1, No. n17827, Sep. 6, 2019 (Sep. 6, 2018), XP030190689, 214 pp. (Year: 2018).*

(Continued)

*Primary Examiner* — Stuart D Bennett
(74) *Attorney, Agent, or Firm* — SLATER MATSIL, LLP

(57) ABSTRACT

A client, a server, and a method for processing media data, the method including obtaining an overlay and information about a region associated with the overlay, where the information about the region associated with the overlay is used to indicate the region associated with the overlay, and displaying the overlay when a trigger operation for the region associated with the overlay is detected.

11 Claims, 6 Drawing Sheets

(56) References Cited

U.S. PATENT DOCUMENTS

| | | | |
|---|---|---|---|
| 2007/0094703 A1* | 4/2007 | Nygaard | H04N 7/16 |
| | | | 348/E7.071 |
| 2011/0093783 A1* | 4/2011 | Parra | G06Q 30/02 |
| | | | 707/E17.014 |
| 2012/0331506 A1 | 12/2012 | Arriola et al. | |
| 2013/0249900 A1 | 9/2013 | Lee et al. | |
| 2018/0246641 A1 | 8/2018 | Glaser et al. | |
| 2019/0191203 A1* | 6/2019 | Asbun | H04N 21/4316 |
| 2019/0325652 A1 | 10/2019 | Di et al. | |

FOREIGN PATENT DOCUMENTS

| | | | |
|---|---|---|---|
| CN | 106105220 A | 11/2016 | |
| CN | 106233745 A | 12/2016 | |
| CN | 107534794 A | 1/2018 | |
| CN | 108271044 A | 7/2018 | |
| CN | 108501808 A | 9/2018 | |
| WO | WO-2009111699 A2 * | 9/2009 | G06Q 30/02 |
| WO | 2017205794 A1 | 11/2017 | |

OTHER PUBLICATIONS

"WD ISP/EC 23090-2 2nd Edition OMAF", 123.MPEG Meeting; Jul. 16, 2018-Jul. 20, 2018; Ljubljana; Motion Picture Expert Group, ISO/IEC JTC1/SC29/WG1 1, No. n17827, Sep. 6, 2019 (Sep. 6, 2018), XP030190689, 214 pp. (Year: 2018).*

Hellge, C., "Live Streaming Ultra High Resolution 360-Degree Video with MPEG-OMAF and HEVC Tiles," Fraunhofer HHI, XP055844479, Aug. 31, 2018, 5 pages.

Wang, Y.K. et al., "OMAF ROI Signalling in ISOBMFF," International Organisation for Standardisation Organisation Internationale de Normalisation ISO/IEC JTC1/SC29/WG11 Coding of Moving Pictures and Audio, Source: Qualcomm Incorporated, Status: Input Contribution, Jan. 2017, 4 pages.

"Series H: Audiovisual and Multimedia Systems, Infrastructure of audiovisual services—Coding of moving video, Advanced video coding for generic audiovisual services," ITU-T H.264, Telecommunication Standardization Sector of ITU, Apr. 2017, 812 pages.

"Series H: Audiovisual and Multimedia Systems, Infrastructure of audiovisual services—Coding of moving video High efficiency video coding," ITU-T H.265, Telecommunication Standardization Sector of ITU, Feb. 2018, 692 pages.

"WD ISO/IEC 23090-2 2nd edition OMAF," 123.MPEG Meeting;Jul. 16, 2018-Jul. 20, 2018; Ljubljana; (Motion Picture Expert Group or ISO/IEC JTC1/SC29/WG1 1), No. n17827, Sep. 6, 2018 (Sep. 6, 2018), XP030190689, total 214 pages.

Kammachi-Sreedhar (Nokia) K et al: "[OMAF] Signalling of Overlays in DASH, " 123.MPEG Meeting; Jul. 16, 2018-Jul. 20, 2018; Ljubljana; (Motion Picture Expert Group or ISO/IEC JTC1/SC29/WG11), No. m43416, Jul. 6, 2018 (Jul. 6, 2018), XP030196126, total 3 pages.

Ye-Kui Wang et al., "WD 3 of ISO/IEC 23090-2 OMAF 2nd edition," ISO/IEC JTC1/SC29/WG11 N17963-v1,Oct. 2018, 226 pages.

Yuqun Fan et al., "[OMAF] On associated region of an overlay," ISO/IEC JTC1/SC29/WG11 MPEG2018/M44530, Oct. 2018, 2 pages.

* cited by examiner

METHOD FOR PROCESSING MEDIA DATA, CLIENT, AND SERVER

CROSS-REFERENCE TO RELATED APPLICATIONS

This application is a continuation of International Application No. PCT/CN2018/125807, filed on Dec. 29, 2018, which claims priority to U.S. Provisional Patent Application No. 62/737,892, filed on Sep. 27, 2018. The disclosures of the aforementioned applications are hereby incorporated by reference in their entireties.

TECHNICAL FIELD

This application relates to the field of streaming media transmission technologies, and more specifically, to a method for processing media data, a client, and a server.

BACKGROUND

The ISO/IEC 23090-2 standard specification is also referred to as the OMAF (omnidirectional media format) standard specification. The specification defines a media application format, and the media application format can implement presentation of omnidirectional media in an application. The omnidirectional media mainly refers to an omnidirectional video (a 360-degree video) and associated audio. In the OMAF specification, a list of projection methods that can be used to convert a spherical video into a two-dimensional video is first specified. Further, how to store, in an ISO base media file format (International Organization for Standardization (ISO) base media file format, ISOBMFF), omnidirectional media and metadata associated with the media is specified. Also specified are how to encapsulate omnidirectional media data in a streaming media system and how to transmit the omnidirectional media data by using transmission methods such as dynamic adaptive streaming over hypertext transfer protocol (HTTP) (DASH) transmission and dynamic adaptive streaming transmission that is specified in the ISO/IEC 23009-1 standard.

The ISO base media file format includes a series of boxes (box). One box may further include another box. Boxes include a metadata box and a media data box. The metadata box (moov box) includes metadata, and the media data box (mdat box) includes media data. The metadata box and the media data box may be in a same file or in separate files. If timed metadata is encapsulated in the ISO base media file format, the metadata box includes metadata that is used to describe the timed metadata, and the media data box includes the timed metadata.

In an existing solution, a basic data structure and a carrying manner of an overlay image are defined, but display of an overlay lacks flexibility and diversity.

SUMMARY

This application provides a method for processing media data and an apparatus, to display an overlay more flexibly in a more diversified manner.

According to a first aspect, a method for processing media data is provided. The method may include: obtaining an overlay and information about a region associated with the overlay, where the information about the region associated with the overlay is used to indicate the region associated with the overlay, and displaying the overlay when a trigger operation for the region associated with the overlay is detected.

The information about the region associated with the overlay may enable a user to switch between overlay display and overlay undisplay.

The method may be performed by a client.

The overlay is a video, an image, or text that is used to be superimposed on a background video or a background image for display.

The overlay may be an image used for an omnidirectional video image.

The method may further include: obtaining the background video or the background image. The displaying the overlay may include: superimposing the overlay on the background video or the background image, and displaying a video image obtained through superimposition. The background video or the background image may be an image used for the omnidirectional video image.

The trigger operation for the region associated with the overlay may include a trigger operation for the region associated with the overlay of the background video or the background image.

The method may further include: displaying the background video or the background image when the trigger operation for the region associated with the overlay is not detected. It should be understood that, to exclude displaying the overlay, the displaying the background video or the background image may be displaying only the background video or the background image.

Content displayed in the background video or the background image may be a target object, and content of the overlay may be text information of the target object.

A trigger operation on the region associated with the overlay is used to control display or undisplay of the overlay. It should be understood that undisplay means "not display".

With reference to the first aspect, in a first possible implementation of the first aspect, the trigger operation for the region associated with the overlay may include: a tapping operation within the region associated with the overlay or a trigger operation that a line of sight of a user is within the region associated with the overlay.

The trigger operation for the region associated with the overlay may include the tapping operation within the region associated with the overlay. The method may further include: displaying prompt information indicating whether to display the overlay by using the tapping operation within the region associated with the overlay.

The displaying prompt information indicating whether to display the overlay by using the tapping operation within the region associated with the overlay may be performed only when it is detected that at least a part of the region associated with the overlay is within a current user's viewport range.

With reference to the first aspect or the first possible implementation of the first aspect, in a second possible implementation of the first aspect, the information about the region associated with the overlay may be located in an overlay control structure.

With reference to the first aspect, the first possible implementation of the first aspect, or the second possible implementation of the first aspect, in a third possible implementation of the first aspect, the information about the region associated with the overlay may include location information of the region associated with the overlay.

The location information of the region associated with the overlay may include location information of a center point of the region associated with the overlay or location information of a top-left corner point of the region associated with the overlay.

With reference to any one of the first aspect or the foregoing possible implementations of the first aspect, in a fourth possible implementation of the first aspect, the information about the region associated with the overlay may include a width and a height of the region associated with the overlay.

With reference to any one of the first aspect or the foregoing possible implementations of the first aspect, in a fifth possible implementation of the first aspect, the information about the region associated with the overlay is plane region information or sphere region information.

With reference to any one of the first aspect or the foregoing possible implementations of the first aspect, in a sixth possible implementation of the first aspect, the method may further include: obtaining trigger type information. The trigger operation for the region associated with the overlay may include a trigger operation, indicated by the trigger type information, for the region associated with the overlay.

The trigger type information may enable the user to trigger display or undisplay of the overlay by using different trigger operations. It should be understood that the trigger type information is used to indicate a trigger type of the trigger operation that is used to trigger display or undisplay of the overlay.

With reference to the sixth possible implementation of the first aspect, in a seventh possible implementation of the first aspect, the trigger type information is located in the overlay control structure.

With reference to the sixth possible implementation of the first aspect, in an eighth possible implementation of the first aspect, the trigger type information is located in a media presentation description (MPD).

With reference to the eighth possible implementation of the first aspect, in a ninth possible implementation of the first aspect, the trigger type information may be attribute information of an overlay descriptor in the MPD.

With reference to any one of the first aspect or the foregoing possible implementations of the first aspect, in a tenth possible implementation of the first aspect, the method may further include: obtaining a conditional trigger flag, and when a value of the conditional trigger flag is a first preset value, detecting whether there is a trigger operation for the region associated with the overlay.

It should be understood that, the first preset value of the conditional trigger flag is used to indicate that display or undisplay of the overlay is controlled by using the trigger operation for triggering display or undisplay of the overlay. A second preset value of the conditional trigger flag is used to indicate that display or undisplay of the overlay is not controlled by using the trigger operation for triggering display or undisplay of the overlay.

That the value of the conditional trigger flag is the second preset value may be used to indicate that display or undisplay of the overlay is not controlled by using the trigger operation.

The conditional trigger flag further increases diversity of interaction manners for displaying the overlay.

With reference to the tenth possible implementation of the first aspect, in an eleventh possible implementation of the first aspect, the conditional trigger flag may be located in the overlay control structure that is used for user interaction control.

With reference to any one of the first aspect or the foregoing possible implementations of the first aspect, in a twelfth possible implementation of the first aspect, the information about the region associated with the overlay is located in the media presentation description (MPD).

With reference to the twelfth possible implementation of the fifth aspect, in a thirteenth possible implementation of the fifth aspect, the information about the region associated with the overlay is the attribute information of the overlay descriptor in the MPD.

According to a second aspect, a method for processing media data is provided. The method may include: obtaining an overlay, a background video or a background image, and information about a region associated with the overlay, where the information about the region associated with the overlay is used to indicate the region associated with the overlay, obtaining an initial status flag, and when a value of the initial status flag indicates that the overlay is undisplayed by default, performing the following operations, including displaying the background video or the background image, and when a trigger operation for the region associated with the overlay is detected, superimposing the overlay on the background video or the background image, and displaying a video image obtained through superimposition. The displaying the background video or the background image may be performed only when a trigger operation for the region associated with the overlay is not detected.

The initial status flag further increases diversity of manners for displaying the overlay.

The method may be performed by a client.

The overlay is a video, an image, or text that is used to be superimposed on the background video or the background image for display.

The overlay may be an image used for an omnidirectional video image. The background video or the background image may be an image used for the omnidirectional video image.

Content displayed in the background video or the background image may be a target object, and content of the overlay may be text information of the target object.

The trigger operation for the region associated with the overlay may include: a tapping operation within the region associated with the overlay or a trigger operation that a line of sight of a user is within the region associated with the overlay.

Alternatively, in the method, when the value of the initial status flag indicates that the overlay is displayed by default, the following operations may be performed: superimposing the overlay on the background video or the background image, and displaying a video image obtained through superimposition, and displaying the background video or the background image when a trigger operation for the region associated with the overlay is detected.

It should be understood that undisplay of the overlay by default may be understood as that the overlay is in an undisplayed state initially, and depending on different values, the initial status flag is used to indicate that the overlay is in a displayed state initially or is used to indicate that the overlay is in the undisplayed state initially.

A trigger operation on the region associated with the overlay is used to control display or undisplay of the overlay. It should be understood that undisplay means "not display".

With reference to the second aspect, in a first possible implementation of the second aspect, the trigger operation for the region associated with the overlay may include the tapping operation within the region associated with the overlay, and the method may further include: when the value of the initial status flag indicates that the overlay is undisplayed by default, displaying prompt information indicating whether to display the overlay by using the tapping operation within the region associated with the overlay.

With reference to the first possible implementation of the second aspect, in a second possible implementation of the second aspect, the displaying prompt information indicating whether to display the overlay by using the tapping operation within the region associated with the overlay is performed only when it is detected that at least a part of the region associated with the overlay is within a current user's viewport range.

With reference to any one of the second aspect or the foregoing possible implementations of the second aspect, in a third possible implementation of the second aspect, the information about the region associated with the overlay and the initial status flag are located in an overlay control structure.

With reference to any one of the second aspect or the foregoing possible implementations of the second aspect, in a fourth possible implementation of the second aspect, the information about the region associated with the overlay and the initial status flag are located in a media presentation description (MPD).

With reference to the fourth possible implementation of the second aspect, in a fifth possible implementation of the second aspect, the information about the region associated with the overlay and the initial status flag are attribute information of an overlay descriptor in the MPD.

With reference to any one of the second aspect or the foregoing possible implementations of the second aspect, in a sixth possible implementation of the second aspect, the method may further include: obtaining trigger type information. The trigger operation for the region associated with the overlay may include a trigger operation, indicated by the trigger type information, for the region associated with the overlay.

It should be understood that the trigger type information is used to indicate a trigger type of the trigger operation that is used to trigger display or undisplay of the overlay.

With reference to the sixth possible implementation of the second aspect, in a seventh possible implementation of the second aspect, the trigger type information is located in the overlay control structure.

With reference to the sixth possible implementation of the second aspect, in an eighth possible implementation of the second aspect, the trigger type information is located in the media presentation description (MPD).

With reference to the eighth possible implementation of the second aspect, in a ninth possible implementation of the second aspect, the trigger type information is the attribute information of the overlay descriptor in the MPD.

With reference to any one of the second aspect or the foregoing possible implementations of the second aspect, in a tenth possible implementation of the second aspect, the method may further include: obtaining a conditional trigger flag, and when a value of the conditional trigger flag is a first preset value, detecting whether there is a trigger operation for the region associated with the overlay.

It should be understood that, the first preset value of the conditional trigger flag is used to indicate that display or undisplay of the overlay is controlled by using the trigger operation for triggering display or undisplay of the overlay. A second preset value of the conditional trigger flag is used to indicate that display or undisplay of the overlay is not controlled by using the trigger operation for triggering display or undisplay of the overlay.

That the value of the conditional trigger flag is the second preset value may be used to indicate that display or undisplay of the overlay is not controlled by using the trigger operation.

With reference to the tenth possible implementation of the second aspect, in an eleventh possible implementation of the second aspect, the conditional trigger flag is located in the overlay control structure that is used for user interaction control.

According to a third aspect, a method for processing media data is provided. The method may include: obtaining an overlay, a background video or a background image, and information about a region associated with the overlay, where the information about the region associated with the overlay is used to indicate the region associated with the overlay, obtaining an initial status flag, and when a value of the initial status flag indicates that the overlay is displayed by default, performing the following operations, including superimposing the overlay on the background video or the background image, and displaying a video image obtained through superimposition, and displaying the background video or the background image when a trigger operation for the region associated with the overlay is detected. The displaying a video image obtained through superimposition may be performed only when a trigger operation for the region associated with the overlay is not detected.

The method may be performed by a client.

The overlay is a video, an image, or text that is used to be superimposed on the background video or the background image for display.

The overlay may be an image used for an omnidirectional video image. The background video or the background image may be an image used for the omnidirectional video image.

Content displayed in the background video or the background image may be a target object, and content of the overlay may be text information of the target object.

The trigger operation for the region associated with the overlay may include: a tapping operation within the region associated with the overlay or a trigger operation that a line of sight of a user is within the region associated with the overlay.

It should be understood that display of the overlay by default may be understood as that the overlay is in a displayed state initially, and depending on different values, the initial status flag is used to indicate that the overlay is in the displayed state initially or is used to indicate that the overlay is in an undisplayed state initially.

A trigger operation on the region associated with the overlay is used to control display or undisplay of the overlay. It should be understood that undisplay means "not display".

With reference to the third aspect, in a first possible implementation of the third aspect, the trigger operation for the region associated with the overlay may include the tapping operation within the region associated with the overlay, and the method may further include: when the value of the initial status flag indicates that the overlay is displayed by default, displaying prompt information indicating whether to undisplay the overlay by using the tapping operation within the region associated with the overlay.

With reference to the first possible implementation of the third aspect, in a second possible implementation of the third aspect, the displaying prompt information indicating whether to undisplay the overlay by using the tapping operation within the region associated with the overlay is performed only when it is detected that at least a part of the region associated with the overlay is within a current user's viewport range.

With reference to any one of the third aspect or the foregoing possible implementations of the third aspect, in a third possible implementation of the third aspect, the information about the region associated with the overlay and the initial status flag are located in an overlay control structure.

With reference to any one of the third aspect or the foregoing possible implementations of the third aspect, in a fourth possible implementation of the third aspect, the information about the region associated with the overlay and the initial status flag are located in a media presentation description (MPD).

With reference to the fourth possible implementation of the third aspect, in a fifth possible implementation of the third aspect, the information about the region associated with the overlay and the initial status flag are attribute information of an overlay descriptor in the MPD.

With reference to any one of the third aspect or the foregoing possible implementations of the third aspect, in a sixth possible implementation of the third aspect, the method may further include: obtaining trigger type information, and the trigger operation for the region associated with the overlay may include a trigger operation, indicated by the trigger type information, for the region associated with the overlay.

It should be understood that the trigger type information is used to indicate a trigger type of the trigger operation that is used to trigger display or undisplay of the overlay.

With reference to the sixth possible implementation of the third aspect, in a seventh possible implementation of the third aspect, the trigger type information is located in the overlay control structure.

With reference to the sixth possible implementation of the third aspect, in an eighth possible implementation of the third aspect, the trigger type information is located in the media presentation description (MPD).

With reference to the eighth possible implementation of the third aspect, in a ninth possible implementation of the third aspect, the trigger type information is the attribute information of the overlay descriptor in the MPD.

With reference to any one of the third aspect or the foregoing possible implementations of the third aspect, in a tenth possible implementation of the third aspect, the method may further include: obtaining a conditional trigger flag, and when a value of the conditional trigger flag is a first preset value, detecting whether there is a trigger operation for the region associated with the overlay.

It should be understood that, the first preset value of the conditional trigger flag is used to indicate that display or undisplay of the overlay is controlled by using the trigger operation for triggering display or undisplay of the overlay. A second preset value of the conditional trigger flag is used to indicate that display or undisplay of the overlay is not controlled by using the trigger operation for triggering display or undisplay of the overlay.

With reference to the tenth possible implementation of the third aspect, in an eleventh possible implementation of the third aspect, the conditional trigger flag is located in the overlay control structure that is used for user interaction control.

According to a fourth aspect, a method for processing media data is provided. The method may include: determining information about a region associated with an overlay, where the information about the region associated with the overlay is used to indicate the region associated with the overlay, and sending the information about the region associated with the overlay to a client.

The information about the region associated with the overlay may be determined by detecting location information of a target object (for example, the target object may be a person), or may be determined by detecting region information entered by a user.

The method may be performed by a server.

A trigger operation on the region associated with the overlay is used to control display or undisplay of the overlay. The trigger operation may include: a tapping operation within the region associated with the overlay or a trigger operation that a line of sight of the user is within the region associated with the overlay.

The overlay is a video, an image, or text that is used to be superimposed on a background video or a background image (which may be at least a part of a region) for display.

The method may further include: obtaining the overlay, encoding the overlay to obtain bitstream data of the overlay, and sending the bitstream data of the overlay to the client. The overlay may be an image used for an omnidirectional video image.

The method may further include: obtaining the background video or the background image, encoding the background video or the background image to obtain bitstream data of the background video or the background image, and sending the bitstream data of the background video or the background image to the client. The background video or the background image may be an image used for the omnidirectional video image.

Content displayed in the background video or the background image may be a target object, and content of the overlay may be text information of the target object.

With reference to the fourth aspect, in a first possible implementation of the fourth aspect, the information about the region associated with the overlay is located in an overlay control structure.

With reference to the fourth aspect or the first possible implementation of the fourth aspect, in a second possible implementation of the fourth aspect, the information about the region associated with the overlay may include location information of the region associated with the overlay.

The location information of the region associated with the overlay may include location information of a center point of the region associated with the overlay or location information of a top-left corner point of the region associated with the overlay.

With reference to any one of the fourth aspect or the foregoing possible implementations of the fourth aspect, in a third possible implementation of the fourth aspect, the information about the region associated with the overlay may include a width and a height of the region associated with the overlay.

With reference to any one of the fourth aspect or the foregoing possible implementations of the fourth aspect, in a fourth possible implementation of the fourth aspect, the information about the region associated with the overlay is plane region information or sphere region information.

With reference to any one of the fourth aspect or the foregoing possible implementations of the fourth aspect, in a fifth possible implementation of the fourth aspect, the method may further include: sending trigger type information to the client, where the trigger type information is used to indicate a trigger type of the trigger operation that is used to trigger display or undisplay of the overlay.

With reference to the fifth possible implementation of the fourth aspect, in a sixth possible implementation of the fourth aspect, the trigger type information is located in the overlay control structure.

With reference to the fifth possible implementation of the fourth aspect, in a seventh possible implementation of the fourth aspect, the trigger type information is located in a media presentation description (MPD).

With reference to the seventh possible implementation of the fourth aspect, in an eighth possible implementation of the fourth aspect, the trigger type information is attribute information of an overlay descriptor in the MPD.

With reference to any one of the fourth aspect or the foregoing possible implementations of the fourth aspect, in a ninth possible implementation of the fourth aspect, the method may further include: sending a conditional trigger flag to the client, where a first preset value of the conditional trigger flag is used to indicate that display or undisplay of the overlay is controlled by using the trigger operation for triggering display or undisplay of the overlay.

A second preset value of the conditional trigger flag is used to indicate that display or undisplay of the overlay is not controlled by using the trigger operation for triggering display or undisplay of the overlay.

With reference to the ninth possible implementation of the fourth aspect, in a tenth possible implementation of the fourth aspect, the conditional trigger flag is located in the overlay control structure that is used for user interaction control.

With reference to any one of the fourth aspect or the foregoing possible implementations of the fourth aspect, in an eleventh possible implementation of the fourth aspect, the information about the region associated with the overlay is located in the media presentation description (MPD).

With reference to the eleventh possible implementation of the fourth aspect, in a twelfth possible implementation of the fourth aspect, the information about the region associated with the overlay is the attribute information of the overlay descriptor in the MPD.

With reference to any one of the fourth aspect or the foregoing possible implementations of the fourth aspect, in a thirteenth possible implementation of the fourth aspect, the method may further include: sending an initial status flag to the client, where the initial status flag is used to indicate that the overlay is in a displayed state initially or is used to indicate that the overlay is in an undisplayed state initially.

With reference to the thirteenth possible implementation of the fourth aspect, in a fourteenth possible implementation of the fourth aspect, the initial status flag is located in the overlay control structure.

With reference to the thirteenth possible implementation of the fourth aspect, in a fifteenth possible implementation of the fourth aspect, the initial status flag is located in the media presentation description (MPD).

With reference to the fifteenth possible implementation of the fourth aspect, in a sixteenth possible implementation of the fourth aspect, the initial status flag is the attribute information of the overlay descriptor in the MPD.

According to a fifth aspect, a client is provided. The client may include: an obtaining module, configured to obtain an overlay and information about a region associated with the overlay, where the information about the region associated with the overlay is used to indicate the region associated with the overlay, and a display module, configured to display the overlay when a trigger operation for the region associated with the overlay is detected.

With reference to the fifth aspect, in a first possible implementation of the fifth aspect, the trigger operation for the region associated with the overlay may include: a tapping operation within the region associated with the overlay or a trigger operation that a line of sight of a user is within the region associated with the overlay.

With reference to the fifth aspect or the first possible implementation of the fifth aspect, in a second possible implementation of the fifth aspect, the information about the region associated with the overlay may be located in an overlay control structure.

With reference to the fifth aspect, the first possible implementation of the fifth aspect, or the second possible implementation of the fifth aspect, in a third possible implementation of the fifth aspect, the information about the region associated with the overlay may include location information of the region associated with the overlay.

With reference to any one of the fifth aspect or the foregoing possible implementations of the fifth aspect, in a fourth possible implementation of the fifth aspect, the information about the region associated with the overlay may include a width and a height of the region associated with the overlay.

With reference to any one of the fifth aspect or the foregoing possible implementations of the fifth aspect, in a fifth possible implementation of the fifth aspect, the information about the region associated with the overlay is plane region information or sphere region information.

With reference to any one of the fifth aspect or the foregoing possible implementations of the fifth aspect, in a sixth possible implementation of the fifth aspect, the obtaining module is further configured to obtain trigger type information. The trigger operation for the region associated with the overlay may include a trigger operation, indicated by the trigger type information, for the region associated with the overlay.

With reference to the sixth possible implementation of the fifth aspect, in a seventh possible implementation of the fifth aspect, the trigger type information is located in the overlay control structure.

With reference to the sixth possible implementation of the fifth aspect, in an eighth possible implementation of the fifth aspect, the trigger type information is located in a media presentation description (MPD).

With reference to the eighth possible implementation of the fifth aspect, in a ninth possible implementation of the fifth aspect, the trigger type information may be attribute information of an overlay descriptor in the MPD.

With reference to any one of the fifth aspect or the foregoing possible implementations of the fifth aspect, in a tenth possible implementation of the fifth aspect, the obtaining module is further configured to obtain a conditional trigger flag, and the client may further include a detection module, configured to: when a value of the conditional trigger flag is a first preset value, detect whether there is a trigger operation for the region associated with the overlay.

With reference to the tenth possible implementation of the fifth aspect, in an eleventh possible implementation of the fifth aspect, the conditional trigger flag may be located in the overlay control structure that is used for user interaction control.

With reference to any one of the fifth aspect or the foregoing possible implementations of the fifth aspect, in a twelfth possible implementation of the fifth aspect, the information about the region associated with the overlay is located in the media presentation description (MPD).

With reference to the twelfth possible implementation of the fifth aspect, in a thirteenth possible implementation of the fifth aspect, the information about the region associated with the overlay is the attribute information of the overlay descriptor in the MPD.

According to a sixth aspect, a client is provided. The client may include: an obtaining module, configured to obtain an overlay, a background video or a background image, and information about a region associated with the overlay, where the information about the region associated with the overlay is used to indicate the region associated with the overlay, and obtain an initial status flag, and a display module, configured to: when a value of the initial status flag indicates that the overlay is undisplayed by default, perform the following operations, including displaying the background video or the background image, and when a trigger operation for the region associated with the overlay is detected, superimposing the overlay on the background video or the background image, and displaying a video image obtained through superimposition. The displaying the background video or the background image may be performed only when a trigger operation for the region associated with the overlay is not detected.

With reference to the sixth aspect, in a first possible implementation of the sixth aspect, the trigger operation for the region associated with the overlay may include a tapping operation within the region associated with the overlay, and the display module is further configured to: when the value of the initial status flag indicates that the overlay is undisplayed by default, display prompt information indicating whether to display the overlay by using the tapping operation within the region associated with the overlay.

With reference to the first possible implementation of the sixth aspect, in a second possible implementation of the sixth aspect, the displaying prompt information indicating whether to display the overlay by using the tapping operation within the region associated with the overlay is performed only when it is detected that at least a part of the region associated with the overlay is within a current user's viewport range.

With reference to any one of the sixth aspect or the foregoing possible implementations of the sixth aspect, in a third possible implementation of the sixth aspect, the information about the region associated with the overlay and the initial status flag are located in an overlay control structure.

With reference to any one of the sixth aspect or the foregoing possible implementations of the sixth aspect, in a fourth possible implementation of the sixth aspect, the information about the region associated with the overlay and the initial status flag are located in a media presentation description (MPD).

With reference to the fourth possible implementation of the sixth aspect, in a fifth possible implementation of the sixth aspect, the information about the region associated with the overlay and the initial status flag are attribute information of an overlay descriptor in the MPD.

With reference to any one of the sixth aspect or the foregoing possible implementations of the sixth aspect, in a sixth possible implementation of the sixth aspect, the obtaining module is further configured to obtain trigger type information. The trigger operation for the region associated with the overlay may include a trigger operation, indicated by the trigger type information, for the region associated with the overlay.

With reference to the sixth possible implementation of the sixth aspect, in a seventh possible implementation of the sixth aspect, the trigger type information is located in the overlay control structure.

With reference to the sixth possible implementation of the sixth aspect, in an eighth possible implementation of the sixth aspect, the trigger type information is located in the media presentation description (MPD).

With reference to the eighth possible implementation of the sixth aspect, in a ninth possible implementation of the sixth aspect, the trigger type information is the attribute information of the overlay descriptor in the MPD.

With reference to any one of the sixth aspect or the foregoing possible implementations of the sixth aspect, in a tenth possible implementation of the sixth aspect, the obtaining module is further configured to obtain a conditional trigger flag. The client may further include a detection module, configured to: when a value of the conditional trigger flag is a first preset value, detect whether there is a trigger operation for the region associated with the overlay.

With reference to the tenth possible implementation of the sixth aspect, in an eleventh possible implementation of the sixth aspect, the conditional trigger flag is located in the overlay control structure that is used for user interaction control.

According to a seventh aspect, a client is provided. The client may include: an obtaining module, configured to obtain an overlay, a background video or a background image, and information about a region associated with the overlay, where the information about the region associated with the overlay is used to indicate the region associated with the overlay, and obtain an initial status flag, and a display module, configured to: when a value of the initial status flag indicates that the overlay is displayed by default, perform the following operations, including superimposing the overlay on the background video or the background image, and displaying a video image obtained through superimposition, and displaying the background video or the background image when a trigger operation for the region associated with the overlay is detected. The displaying a video image obtained through superimposition may be performed only when a trigger operation for the region associated with the overlay is not detected.

With reference to the seventh aspect, in a first possible implementation of the seventh aspect, the trigger operation for the region associated with the overlay may include a tapping operation within the region associated with the overlay, and the display module is further configured to: when the value of the initial status flag indicates that the overlay is displayed by default, display prompt information indicating whether to undisplay the overlay by using the tapping operation within the region associated with the overlay.

With reference to the first possible implementation of the seventh aspect, in a second possible implementation of the seventh aspect, the display module displays the prompt information indicating whether to undisplay the overlay by using the tapping operation within the region associated with the overlay, only when it is detected that at least a part of the region associated with the overlay is within a current user's viewport range.

With reference to any one of the seventh aspect or the foregoing possible implementations of the seventh aspect, in a third possible implementation of the seventh aspect, the information about the region associated with the overlay and the initial status flag are located in an overlay control structure.

With reference to any one of the seventh aspect or the foregoing possible implementations of the seventh aspect, in a fourth possible implementation of the seventh aspect, the information about the region associated with the overlay and the initial status flag are located in a media presentation description (MPD).

With reference to the fourth possible implementation of the seventh aspect, in a fifth possible implementation of the seventh aspect, the information about the region associated with the overlay and the initial status flag are attribute information of an overlay descriptor in the MPD.

With reference to any one of the seventh aspect or the foregoing possible implementations of the seventh aspect, in a sixth possible implementation of the seventh aspect, the obtaining module is further configured to obtain trigger type information, and the trigger operation for the region associated with the overlay may include a trigger operation, indicated by the trigger type information, for the region associated with the overlay.

With reference to the sixth possible implementation of the seventh aspect, in a seventh possible implementation of the seventh aspect, the trigger type information is located in the overlay control structure.

With reference to the sixth possible implementation of the seventh aspect, in an eighth possible implementation of the seventh aspect, the trigger type information is located in the media presentation description (MPD).

With reference to the eighth possible implementation of the seventh aspect, in a ninth possible implementation of the seventh aspect, the trigger type information is the attribute information of the overlay descriptor in the MPD.

With reference to any one of the seventh aspect or the foregoing possible implementations of the seventh aspect, in a tenth possible implementation of the seventh aspect, the obtaining module is further configured to obtain a conditional trigger flag. The client may further include a detection module, configured to: when a value of the conditional trigger flag is a first preset value, detect whether there is a trigger operation for the region associated with the overlay.

With reference to the tenth possible implementation of the seventh aspect, in an eleventh possible implementation of the seventh aspect, the conditional trigger flag is located in the overlay control structure that is used for user interaction control.

According to an eighth aspect, a server is provided. The server may include: a determining module, configured to determine information about a region associated with an overlay, where the information about the region associated with the overlay is used to indicate the region associated with the overlay, and a sending module, configured to send the information about the region associated with the overlay to a client.

With reference to the eighth aspect, in a first possible implementation of the eighth aspect, the information about the region associated with the overlay is located in an overlay control structure.

With reference to the eighth aspect or the first possible implementation of the eighth aspect, in a second possible implementation of the eighth aspect, the information about the region associated with the overlay may include location information of the region associated with the overlay.

With reference to any one of the eighth aspect or the foregoing possible implementations of the eighth aspect, in a third possible implementation of the eighth aspect, the information about the region associated with the overlay may include a width and a height of the region associated with the overlay.

With reference to any one of the eighth aspect or the foregoing possible implementations of the eighth aspect, in a fourth possible implementation of the eighth aspect, the information about the region associated with the overlay is plane region information or sphere region information.

With reference to any one of the eighth aspect or the foregoing possible implementations of the eighth aspect, in a fifth possible implementation of the eighth aspect, the sending module is further configured to send trigger type information to the client, where the trigger type information is used to indicate a trigger type of a trigger operation that is used to trigger display or undisplay of the overlay.

With reference to the fifth possible implementation of the eighth aspect, in a sixth possible implementation of the eighth aspect, the trigger type information is located in the overlay control structure.

With reference to the fifth possible implementation of the eighth aspect, in a seventh possible implementation of the eighth aspect, the trigger type information is located in a media presentation description (MPD).

With reference to the seventh possible implementation of the eighth aspect, in an eighth possible implementation of the eighth aspect, the trigger type information is attribute information of an overlay descriptor in the MPD.

With reference to any one of the eighth aspect or the foregoing possible implementations of the eighth aspect, in a ninth possible implementation of the eighth aspect, the sending module is further configured to send a conditional trigger flag to the client, where a first preset value of the conditional trigger flag is used to indicate that display or undisplay of the overlay is controlled by using the trigger operation for triggering display or undisplay of the overlay.

A second preset value of the conditional trigger flag is used to indicate that display or undisplay of the overlay is not controlled by using the trigger operation for triggering display or undisplay of the overlay.

With reference to the ninth possible implementation of the eighth aspect, in a tenth possible implementation of the eighth aspect, the conditional trigger flag is located in the overlay control structure that is used for user interaction control.

With reference to any one of the eighth aspect or the foregoing possible implementations of the eighth aspect, in an eleventh possible implementation of the eighth aspect, the information about the region associated with the overlay is located in the media presentation description (MPD).

With reference to the eleventh possible implementation of the eighth aspect, in a twelfth possible implementation of the eighth aspect, the information about the region associated with the overlay is the attribute information of the overlay descriptor in the MPD.

With reference to any one of the eighth aspect or the foregoing possible implementations of the eighth aspect, in a thirteenth possible implementation of the eighth aspect, the sending module is further configured to send an initial status flag to the client, where the initial status flag is used to indicate that the overlay is in a displayed state initially or is used to indicate that the overlay is in an undisplayed state initially.

With reference to the thirteenth possible implementation of the eighth aspect, in a fourteenth possible implementation of the eighth aspect, the initial status flag is located in the overlay control structure.

With reference to the thirteenth possible implementation of the eighth aspect, in a fifteenth possible implementation of the eighth aspect, the initial status flag is located in the media presentation description (MPD).

With reference to the fifteenth possible implementation of the eighth aspect, in a sixteenth possible implementation of the eighth aspect, the initial status flag is the attribute information of the overlay descriptor in the MPD.

According to a ninth aspect, a client is provided. The client may include: a non-volatile memory and a processor that are coupled to each other, where the processor is configured to invoke program code stored in the memory, to perform a part of or all steps of the method according to any one of the implementations in the first aspect, the second aspect, or the third aspect.

According to a tenth aspect, a server is provided. The server may include: a non-volatile memory and a processor that are coupled to each other, where the processor is configured to invoke program code stored in the memory, to perform a part of or all steps of the method according to any one of the implementations in the fourth aspect.

According to an eleventh aspect, a computer-readable storage medium is provided. The computer-readable storage medium stores program code, and the program code may include instructions used to perform a part of or all steps of the method according to any one of the implementations in the first aspect, the second aspect, the third aspect, or the fourth aspect.

According to a twelfth aspect, a computer program product is provided. When the computer program product is run on a computer, the computer is enabled to execute instructions used to perform a part of or all steps of the method according to any one of the implementations in the first aspect, the second aspect, the third aspect, or the fourth aspect.

DETAILED DESCRIPTION OF ILLUSTRATIVE EMBODIMENTS

Figure 1:
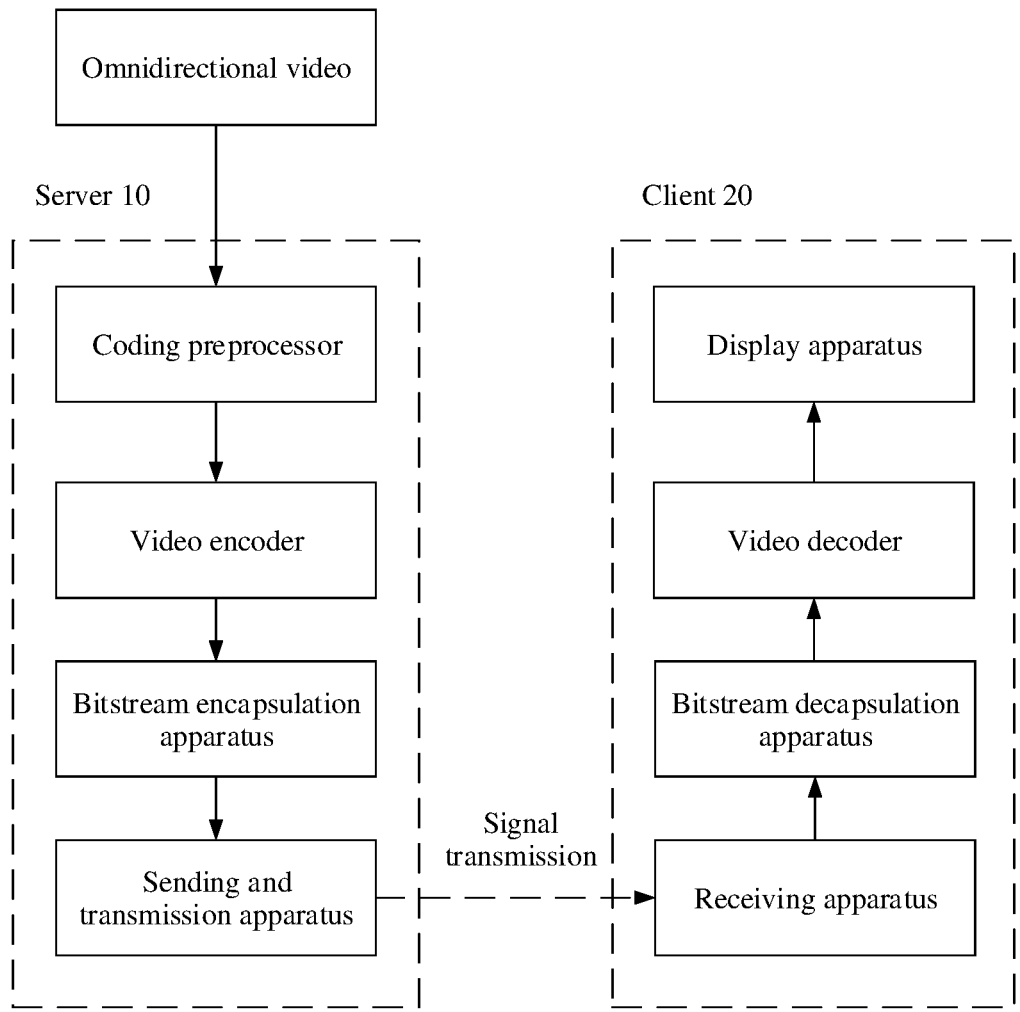
FIG. 1 is a schematic architectural diagram of a system for processing media data according to an embodiment of the present disclosure.

The following describes technical solutions of this application with reference to the accompanying drawings.

To better understand a method for processing media data in the embodiments of this application, the following first briefly describes some basic concepts related to the media data.

Omnidirectional video: The omnidirectional video is also referred to as a 360-degree omnidirectional video or a panoramic video, and includes a series of omnidirectional images. Content in the omnidirectional images covers an entire sphere surface in a three-dimensional space. With rapid development of virtual reality (VR) technologies, omnidirectional videos have been widely applied. According to VR technologies based on 360-degree omnidirectional videos, a stimulation environment can be created to bring dynamic three-dimensional interactive visual experience to a user. An omnidirectional video includes a series of omnidirectional images, and the omnidirectional images may be generated through computer rendering, or may be generated by stitching, by using a stitching algorithm, video images that are shot by a plurality of cameras from a plurality of different angles. Generally, when viewing an omnidirectional video, a user views only a small portion of image content of an entire omnidirectional image at each moment. When the omnidirectional image is to be provided for the user by using a remote server, only content to be viewed at each moment may be transmitted for the user, to save transmission bandwidth.

Track (track): The track refers to a series of timed samples that are encapsulated in an ISO base media file format (ISO base media file format, ISOBMFF). For example, for a video track, a video sample is obtained by encapsulating, according to a specification of the ISOBMFF, a bitstream that is generated after a video encoder encodes each frame.

In the ISO/IEC 14496-12 standard, the track is defined as a "timed sequence of related samples (q.v.) in an ISO base media file", and Chinese translation of the definition is "a timed sequence of related samples in an ISO base media file".

For media data, a track is a sequence of image samples or audio samples, for a hint track, a track corresponds to a streaming channel (For media data, a track corresponds to a sequence of images or sampled audio, for hint tracks, a track corresponds to a streaming channel).

Sample: The sample is data associated with a timestamp. There are the following definition and explanation in the ISO/IEC 14496-12: "all the data associated with a single timestamp".

In a track, two samples corresponding to a same timestamp do not exist (No two samples within a track can share the same time-stamp). In a non-hint track, a sample may be a video frame, a series of video frames in a decoding order, or a compressed audio frame, in a hint track, a sample defines a format of one or more streaming packets (In non-hint tracks, a sample is, for example, an individual frame of video, a series of video frames in decoding order, or a compressed section of audio in decoding order, in hint tracks, a sample defines the formation of one or more streaming packets).

Sample entry: The sample entry is used to describe a format of a sample, and a decoding mode of the sample depends on a type of the sample entry.

MMT: The MMT is an abbreviation of MPEG Media Transport, and defines an encapsulation format, a transmission protocol, and a message sending mechanism of a multimedia service that is based on a packet transmission network.

Box: An ISOBMFF file includes a plurality of boxes, and one box may include another box. A track may include a metadata box (moov box) and/or a media data box (mdat box).

In the ISO/IEC 14496-12 standard, the box is defined as an "object-oriented building block defined by a unique type identifier and length", and Chinese translation of the definition is "an object-oriented building block defined by a unique type identifier and length".

In addition, the box is called an "atom" in some specifications, and may include a first definition of MP4 (Called "atom" in some specifications, including the first definition of MP4).

Supplemental enhancement information (supplementary enhancement information, SEI): The supplemental enhancement information is a type of a network access unit (Network Abstract Layer Unit, NALU) defined in the video coding standards H.264 and H.265 released by the International Telecommunication Union (ITU).

Timed metadata track (Timed metadata track): The timed metadata track is an information metadata stream related to a time sequence.

Overlay: The overlay is an additional layer of video, image, or text (which may have a time attribute) that is superimposed and rendered on a region of a background video or a background image (piece of visual media rendered over omnidirectional video or image item or over a viewport).

Media presentation description (MPD): The media presentation description is a file specified in the ISO/IEC 23009-1 standard. The file includes metadata for constructing an HTTP-URL by a client. The MPD includes one or more period elements. Each period element may include one or more adaptation sets. Each adaptation set may include one or more representations. Each representation may include one or more segments. The client selects a representation based on information in the MPD, and constructs an http-URL of a segment, where the http-URL is used to request the corresponding segment.

To describe time-related attribute information of media data, the OMAF standard specifies a timed metadata track of a region on a sphere. A metadata box in the metadata track includes metadata that describes the sphere. The metadata box describes an intention of the timed metadata track, to be specific, what a sphere region is used for. Two types of timed metadata tracks are described in the OMAF standard: a recommended viewport metadata track (the recommended viewport timed metadata track) and an initial viewpoint track (the initial viewpoint timed metadata track). The recommended viewport track describes a region of a viewport recommended to a terminal for presentation, and the initial viewpoint track describes an initial presentation orientation during omnidirectional video viewing.

In the existing OMAF standard, a format of a sphere region sample entry (Sample Entry) is specified as follows:
  class SphereRegionSampleEntry(type) extends MetaDataSampleEntry(type)
  {
  SphereRegionConfigBox( ); //mandatory
  Box[ ] other_boxes; //optional
  }
  class SphereRegionConfigBox extends FullBox('rosc', version=0, flags)
  {
  unsigned int(8) shape_type;
  bit(7) reserved=0;
  unsigned int(1) dynamic_range_flag;
  if (dynamic_range_flag==0)
  {
  unsigned int(32) static_azimuth_range;
  unsigned int(32) static_elevation_range;
  }
  unsigned int(8) num_regions;
  }

Semantics of fields in the foregoing sphere region sample entry is as follows:
  Shape_type: is used to describe a shape type of a sphere region;
  Reserved: represents a reserved field;
  dynamic_range_flag: when the value is 0, it indicates that horizontal and vertical ranges of the region remain unchanged; when the value is 1, it indicates that horizontal and vertical ranges of the region are described in a sample;
  static_azimuth_range: represents an azimuth coverage range of the region;
  static_elevation_range: represents an elevation coverage range of the region; and
  num_regions: represents a quantity of regions in a metadata track.

Two shape types of sphere regions are defined in the OMAF. One is a shape formed by combining four great circles (Azimuth Circle), and a shape_type value of the shape is 0. The other is a shape formed by combining two great circles and two small circles (Elevation Circle), and a shape_type value of the shape is 1.

In the existing OMAF standard, a format of a sphere region sample (Sample) is defined as follows:
  aligned(8) SphereRegionSample( )
  {
  for(i=0; i<num_regions; i++)
  SphereRegionStruct(dynamic_range_flag)
  }

In the existing OMAF standard, a method for representing a region (region) on a sphere is defined, and specific syntax of the method is defined as follows:
  aligned(8) SphereRegionStruct(range_included_flag)
  {
  signed int(32) center_azimuth;
  signed int(32) center_elevation;
  signed int(32) center_tilt;
  if(range_included_flag)
  {
  unsigned int(32) azimuth_range;
  unsigned int(32) elevation_range;
  }
  unsigned int(1) interpolate;
  bit(7) reserved=0;
  }

Semantics of fields in the foregoing sphere region sample is as follows:
  center_azimuth and center_elevation: represent a position of a center point of a sphere region;
  Center_tilt: represents a tilt angle of the region;
  azimuth_range: represents an azimuth coverage range of the region; and
  Elevation_range: represents an elevation coverage range of the region.

In the existing OMAF standard, a basic data structure and a carrying manner of an overlay are defined.

A data structure format that is used to represent the overlay is defined as follows.

TABLE 1

Definition of an overlay data structure aligned(8) class SingleOverlayStruct( ) {
  unsigned int(16) overlay_id;
  for (i = 0; i < num_flag_bytes * 8; i++)

TABLE 1-continued

Definition of an overlay data structure

```
    unsigned int(1) overlay_control_flag[i];
    for (i = 0; i < num_flag_bytes * 8; i++){
      if (overlay_control_flag[i]) {
        unsigned int(1) overlay_control_essential_flag[i];
        unsigned int(15) byte_count[i];
        unsigned int(8) overlay_control_struct[i][byte_count[i]];
      }
    }
  }
aligned(8) class OverlayStruct( ) {
  unsigned int(16) num_overlays;
  unsigned int(8) num_flag_bytes;
  for (i = 0; i < num_overlays; i++)
    SingleOverlayStruct( );
}
```

Semantics of fields of the overlay data structure is as follows.

OverlayStruct( ) includes overlay-related information, and OverlayStruct( ) may be located in a media data box or a metadata box (box).

SingleOverlayStruct( ) defines an overlay.

num_overlays defines a quantity of overlays (overlay) described in the structure. num_overlays equal to 0 is reserved.

num_flag_bytes defines a total quantity of bytes occupied by the element overlay_control_flag[i]. num_flag_bytes equal to 0 is reserved.

overlay_id represents a unique identifier of an overlay. Two different overlays (overlay) cannot have a same overlay_id value.

When a value of overlay_control_flag[i] is 1, it indicates that a structure defined by the $i^{th}$ overlay_control_struct[i] is present. An OMAF player should support all possible values of overlay_control_flag[i] for all values of i.

When a value of overlay_control_essential_flag[i] is 0, it indicates that the OMAF player does not need to process the structure defined by the $i^{th}$ overlay_control_struct[i].

When a value of overlay_control_essential_flag[i] is 1, it indicates that the OMAF player needs to process the structure defined by the $i^{th}$ overlay_control_struct[i]. When the value of overlay_control_essential_flag[i] is 1 but the OMAF player is incapable of processing the structure defined by the $i^{th}$ overlay_control_struct[i], the OAFplayer should display neither the overlay nor background video stream.

byte_count[i] represents a quantity of bytes occupied by the structure defined by the $i^{th}$ overlay_control_struct[i].

overlay_control_struct[i][byte_count[i]] defines the $i^{th}$ structure having bytes represented by byte_count[i]. Each structure may be referred to as an overlay control structure, and each overlay control structure describes a different attribute of the overlay.

overlay_control_struct defines attributes such as a display region, a content source, a priority, and opacity of the overlay, and the attributes are defined in the following table.

TABLE 2

Overlay control structures

| Bit index | Description |
| --- | --- |
| 0 | Parameters for viewport-relative overlay |
| 1 | Parameters for sphere-relative projected omnidirectional overlay |
| 2 | Parameters for sphere-relative 2D overlay |
| 3 | Source region for the overlay. Indicates the region within the decoded picture that is used as the content of the overlay. |
| 4 | Recommended viewport overlay. Indicates the recommended viewport track whose recommended viewports are used as the content of the overlay. |
| 5 | Overlay layering order |
| 6 | Overlay opacity |
| 7 | Controls for user interaction |
| 8 | Overlay label |
| 9 | Overlay priority |

Specific functions of structures defined in the foregoing table are as follows.

0: defines a parameter indicating that a position for displaying the overlay is relative to a user's viewport (viewport).

1: defines a parameter indicating that a position for displaying the overlay is relative to an omnidirectional sphere.

2: defines a parameter indicating that a position for displaying a 2D overlay is relative to an omnidirectional sphere.

3: defines a parameter indicating the content source of the overlay, where this structure indicates that the content source of the overlay is a decoded image.

4: defines a parameter indicating the content source of the overlay, where this structure indicates that the content source of the overlay is a recommended viewport.

5: defines a parameter indicating an overlay display order.

6: defines a parameter indicating overlay opacity.

7: defines a parameter indicating an interactive operation between the overlay and a user.

8: defines a parameter indicating an overlay label.

9: defines a parameter indicating an overlay priority.

0 to 2 indicate an overlay rendering position, and 3 and 4 indicate where content of the overlay comes from.

The foregoing syntax defines a method for representing one or more overlays (overlay), and related parameters. When the overlay is static, a related structure OverlayStruct of the overlay is carried in an overlay configuration box, where the overlay configuration box is located in a media data track. When the overlay is dynamic, a related structure OverlayStruct of the overlay is carried in a sample entry and a sample of an overlay timed metadata track.

In addition, a format of the overlay in a DASH MPD (Media Presentation Description) is also defined in the OMAF standard. In the OMAF standard, an overlay descriptor is defined in the MPD, and @schemeIdUri of the overlay descriptor is "urn:mpeg:mpegI:omaf:2018:ovly". At most one such descriptor can be present at an adaptation set level of the MPD, and is used to indicate an overlay associated with the adaptation set. In the overlay descriptor, an attribute value is used to indicate an identifier of the overlay, and details are as follows.

TABLE 3

Semantics of the attributes of the OVLY descriptor

| Elements and Attributes for OVLY descriptor Elements and attributes for the overlay descriptor | Use Usage | Data type Data type | Description Description |
|---|---|---|---|
| @value | M Mandatory | omaf:listofUnsignedByte Unsigned integer set | Specifies a whitespace-separated list of overlay IDs of overlays as indicated by overlay_id. Defines a list of whitespace-separated overlay IDs. |

In an existing solution, a basic data structure and a carrying manner of an overlay image are defined, but display of an overlay lacks flexibility and diversity. In view of this, this application provides a method for processing media data, to support conditional display of an overlay by carrying information about a region associated with the overlay. Therefore, the overlay can be displayed more flexibly.

Conditional display or conditionally triggering display means display or undisplay after a trigger operation is detected.

FIG. 1 is a schematic architectural diagram of a system for processing media data according to an embodiment of the present disclosure. As shown in FIG. 1, the system for processing media data may include a server 10 and a client 20.

The server 10 may include at least one of a coding preprocessor, a video encoder, a bitstream encapsulation apparatus (which may be configured to generate an MPD, or certainly, the server 10 may include an additional component to generate an MPD), and a sending and transmission apparatus. The server 10 pre-processes, encodes, or transcodes an omnidirectional video, encapsulates an encoded bitstream data into a file that can be transmitted, and transmits the file to a client or a content delivery network through a network. In addition, the server may select, based on information (for example, a user's viewport or a segmentation request established based on the MPD sent by the server 10) fed back by the client, content that needs to be transmitted, to perform signal transmission.

During specific implementation, the coding preprocessor may be configured to perform a preprocessing operation such as clipping, color and format conversion, color correction, or denoising on an omnidirectional video image.

The video encoder may be configured to encode (encoding may include division) an obtained video image into bitstream data.

The bitstream encapsulation apparatus may be configured to encapsulate the bitstream data and corresponding metadata in a file format that is used for transmission or storage, for example, an ISO base media file format.

The sending and transmission apparatus may be an input/output interface or a communications interface, and may be configured to send encapsulated bitstream data, an MPD, and information that is related to media data transmission to the client.

The sending and transmission apparatus may alternatively be a receiving apparatus. The receiving apparatus may be an input/output interface or a communications interface, and may be configured to receive segmentation request information, user's viewport information, or other information that is related to media data transmission, where the segmentation request information, the user's viewport information, or the other information that is related to media data transmission is sent by the client 20.

The server 10 may obtain the omnidirectional video image by using the receiving apparatus, or may include an image source. The image source may be a camera, a video shooting apparatus, or the like, and is configured to generate the omnidirectional video image.

The client 20 may be an electronic device that can be connected to a network, for example, VR glasses, a mobile phone, a tablet, a television, or a computer. The client 20 receives the MPD or media data sent by the server 10, and performs bitstream decapsulation, decoding, and display.

The client 20 may include at least one of a receiving apparatus, a bitstream decapsulation apparatus, a video decoder, and a display apparatus.

During specific implementation, the receiving apparatus may be an input/output interface or a communications interface, and may be configured to receive the encapsulated bitstream data, the MPD, and the information related to media data transmission.

The bitstream decapsulation apparatus may be configured to obtain required bitstream data and corresponding metadata.

The video decoder may be configured to perform decoding based on the corresponding metadata and the bitstream data, to obtain a video image.

The display apparatus may be configured to display the video image, or display the video image based on the corresponding metadata.

The receiving apparatus may alternatively be a sending apparatus, and is configured to send the user's viewport information or the other information related to media data transmission to the server 10, or send the segmentation request information based on the MPD to the server 10.

The receiving apparatus may further receive a user instruction. For example, the receiving apparatus may be an input interface connected to a mouse.

The display apparatus may alternatively be a touchscreen, and is configured to receive the user instruction while displaying the video image, so as to implement interaction with a user.

It should be understood that the coding preprocessor, the video encoder, the bitstream encapsulation apparatus, the bitstream decapsulation apparatus, or the video decoder may be implemented by reading instructions in a memory and executing the instructions by a processor, or may be implemented by using a chip circuit.

The method for processing media data provided in this embodiment of the present disclosure may be applied to the server 10 or the client 20. The server 10 may place, into a bitstream encapsulation video file format or an MPD description, a description of a region that is associated with an encoded overlay image. The client 20 may obtain, for the bitstream by using the corresponding decapsulation apparatus, encapsulated information about the region that is associated with the overlay, to guide a client player (which may include at least one of the receiving apparatus, the bitstream decapsulation apparatus, and the video decoder) to display the overlay image conditionally and display a background video or a background image by using the display apparatus.

It should be noted that, in this application, a conditional overlay is an overlay that is displayed or undisplayed only when a trigger operation for a region associated with the overlay is detected. Conditional display of the overlay means that the overlay is displayed or undisplayed only when the trigger operation for the region associated with the overlay is detected.

Figure 2:
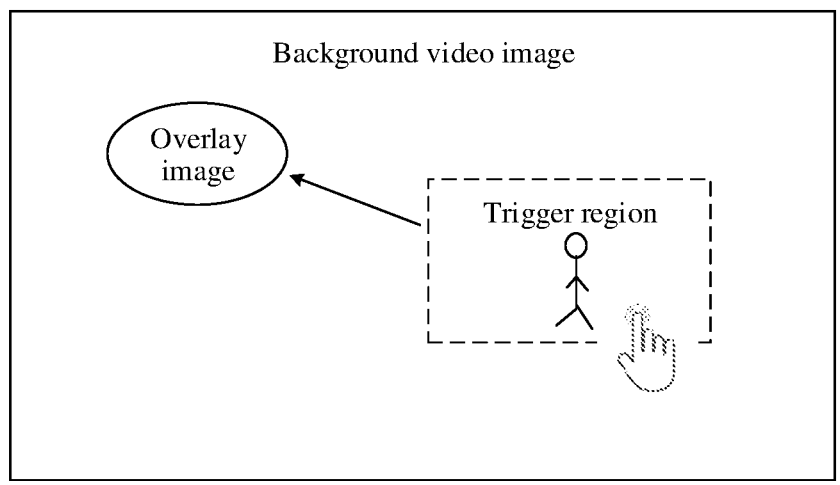
FIG. 2 is a schematic diagram of an implementation scenario according to an embodiment of the present disclosure.

FIG. 2 is a schematic diagram of an implementation scenario according to an embodiment of the present disclosure. As shown in FIG. 2, this embodiment of the present disclosure is used to describe a representation of a conditional overlay. A user may display or undisplay an overlay by tapping a region associated with the overlay in a background video or a background image. For example, in FIG. 2, the user may trigger, by tapping a region in which a player is present, an overlay that describes an attribute of the player, such as the name or age of the player.

Figure 3:
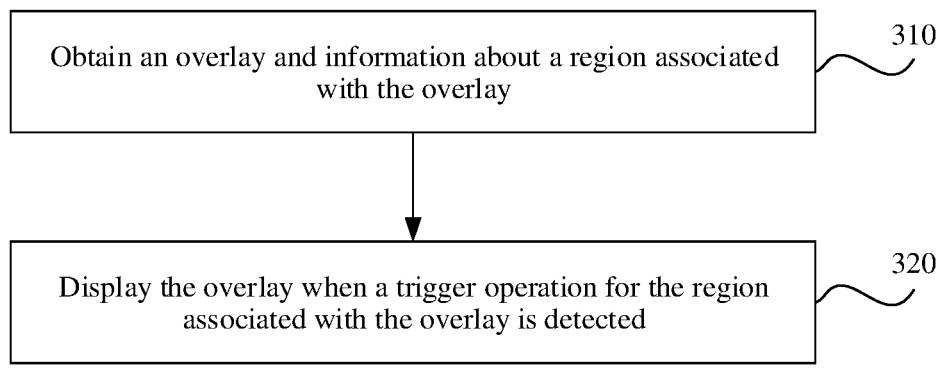
FIG. 3 is a schematic flowchart of a method for processing media data according to an embodiment of this application.

FIG. 3 is a schematic flowchart of a method for processing media data according to an embodiment of this application. The method shown in FIG. 3 may be performed by a client. The client may be a program that is located on a client device and that provides a video playing service for a customer. The client may be a device that has a function of playing an omnidirectional video, for example, a VR device.

The method shown in FIG. 3 may include step 310 and step 320. The following describes step 310 and step 320 in detail.

310: Obtain an overlay and information about a region associated with the overlay, where the information about the region associated with the overlay is used to indicate the region associated with the overlay.

An MPD may be obtained first, and then the overlay is obtained from a server based on the MPD. In this embodiment of the present disclosure, if other information or identifiers are not in the MPD, the information or identifiers may alternatively be obtained from the server based on the MPD. This is not limited herein.

320: Display the overlay when a trigger operation for the region associated with the overlay is detected.

The overlay is a video, an image, or text that is used to be superimposed on a background video or a background image (or at least a part of a region on the background video or the background image) for display.

The trigger operation for the region associated with the overlay may include: a tapping operation within the region associated with the overlay or a trigger operation that a line of sight of a user is within the region associated with the overlay.

Optionally, the information about the region associated with the overlay may be located in an overlay control structure. During specific implementation, the information about the region associated with the overlay may be located in a new overlay control structure different from the foregoing nine overlay control structures, and the information about the region associated with the overlay may be named as an associated region structure (AssociatedSphereRegionStruct).

Optionally, the information about the region associated with the overlay may alternatively be located in the media presentation description (MPD). During specific implementation, the information about the region associated with the overlay is attribute information of an overlay descriptor in the MPD. @schemeIdUri of the overlay descriptor may be "urn:mpeg:mpegI:omaf:2018:ovly", and the descriptor may be present in an adaptation set of the MPD and is used to indicate an overlay associated with the adaptation set.

The information about the region associated with the overlay is plane region information or sphere region information.

The information about the region associated with the overlay may include location information of the region associated with the overlay. Optionally, there may be the following several cases for the location information of the region associated with the overlay.

(1) When the region associated with the overlay is a sphere region, the information about the region associated with the overlay is a sphere coordinate value of a center point of the region associated with the overlay.

For example, a sphere coordinate value of a center point of a current viewport is (X, Y, Z). X corresponds to an azimuth or a yaw of sphere coordinates, Y corresponds to an elevation (pitch or elevation) of the sphere coordinates, and Z corresponds to a tilt or a roll of the sphere coordinates.

(2) When the region associated with the overlay is a plane region, the information about the region associated with the overlay is a plane coordinate value of a center point of the region associated with the overlay.

For example, a two-dimensional coordinate value of the center point of the region associated with the overlay is (X, Y). X and Y respectively represent a horizontal coordinate and a vertical coordinate of the center point of the region associated with the overlay in a two-dimensional rectangular coordinate system.

(3) When the region associated with the overlay is a plane region, the information about the region associated with the overlay is a two-dimensional coordinate value of the top-left corner/top-right corner/bottom-left corner/bottom-right corner of the region associated with the overlay.

For example, when the region associated with the overlay is a plane region, the information about the region associated with the overlay is a two-dimensional coordinate value (X, Y) of the top-left corner of the region associated with the overlay. X and Y respectively represent a horizontal coordinate and a vertical coordinate of the top-left corner of the region associated with the overlay in a two-dimensional rectangular coordinate system.

The information about the region associated with the overlay may include the width and the height of the region associated with the overlay. Optionally, there may be the following several cases for the width and the height of the region associated with the overlay.

(1) If the region associated with the overlay is a sphere region, the width and the height of the region associated with the overlay refer to an azimuth range (a yaw range) and an elevation range of the region associated with the overlay.

For example, the azimuth range (yaw range) of the region associated with the overlay is 110 degrees, and the elevation range of the region associated with the overlay is 90 degrees.

(2) When the region associated with the overlay is a plane region, a coverage area of the region associated with the overlay may include the width and the height of the region associated with the overlay.

Optionally, the method may further include: obtaining trigger type information. The trigger operation for the region associated with the overlay may include a trigger operation, indicated by the trigger type information, for the region associated with the overlay.

During specific implementation, the trigger type information is located in the overlay control structure. For example, the overlay control structure may be the associated region structure (AssociatedSphereRegionStruct) in the foregoing description.

During specific implementation, the trigger type information may alternatively be located in the media presentation description (MPD). During specific implementation, the trigger type information is the attribute information of the overlay descriptor in the MPD. @schemeIdUri of the overlay descriptor may be "urn:mpeg:mpegI:omaf:2018:ovly" in the foregoing description.

Optionally, the method may further include: obtaining a conditional trigger flag, and when a value of the conditional trigger flag is a first preset value, detecting whether there is a trigger operation for the region associated with the overlay. The first preset value of the conditional trigger flag is used to indicate that display or undisplay of the overlay is controlled by using the trigger operation for triggering display or undisplay of the overlay. A second preset value of the conditional trigger flag may be used to indicate that display or undisplay of the overlay is not controlled by using the trigger operation for triggering display or undisplay of the overlay. During specific implementation, the conditional trigger flag is located in the overlay control structure that is used for user interaction control. For example, the overlay control structure may be the overlay control structure (for example, OverlayInteraction) corresponding to the bit index 7 in the foregoing description.

It should be understood that more content related to FIG. 3 has been described in the foregoing description and the Summary, and details are not described herein again.

Figure 4:
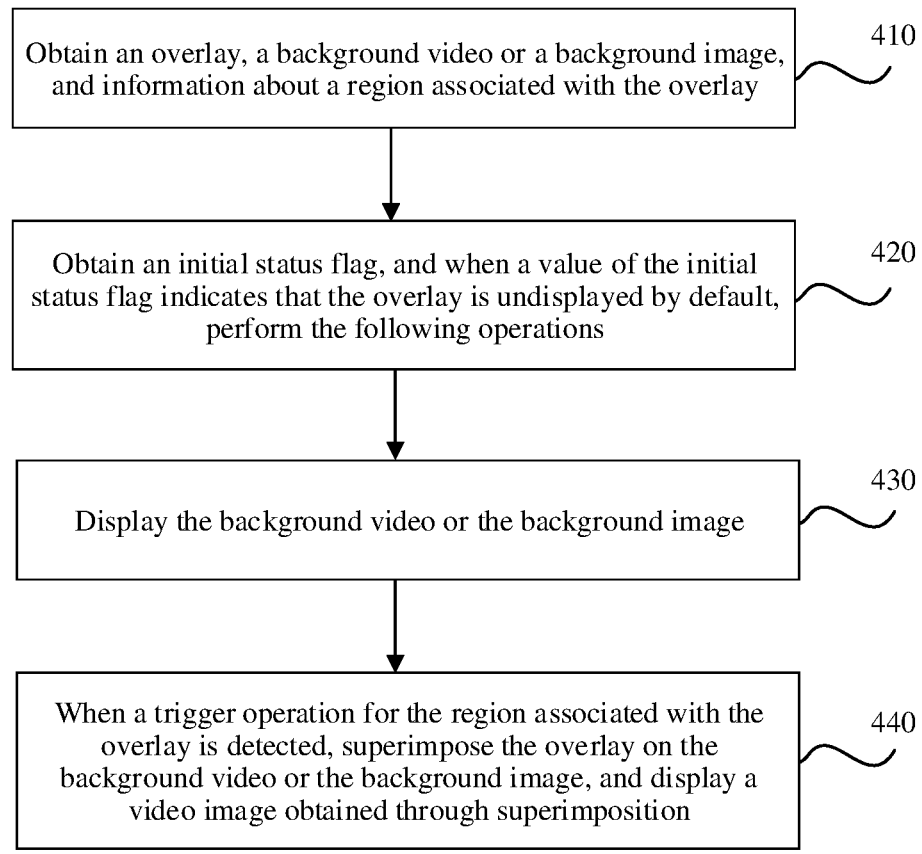
FIG. 4 is a schematic flowchart of a method for processing media data according to an embodiment of this application.

FIG. 4 is a schematic flowchart of a method for processing media data according to an embodiment of this application. The method shown in FIG. 4 may be performed by a client. The client may be a program that is located on a client device and that provides a video playing service for a customer. The client may be a device that has a function of playing an omnidirectional video, for example, a VR device.

The method shown in FIG. 4 may include step 410, step 420, step 430, and step 440. The following describes step 410, step 420, step 430, and step 440 in detail.

410: Obtain an overlay, a background video or a background image, and information about a region associated with the overlay, where the information about the region associated with the overlay is used to indicate the region associated with the overlay.

420: Obtain an initial status flag, and when a value of the initial status flag indicates that the overlay is undisplayed by default, perform the following operations.

430: Display the background video or the background image.

The displaying the background video or the background image may be performed only when a trigger operation for the region associated with the overlay is not detected.

440: When the trigger operation for the region associated with the overlay is detected, superimpose the overlay on the background video or the background image, and display a video image obtained through superimposition.

Optionally, when a value of the initial status flag indicates that the overlay is displayed by default, the following operations may be performed, including superimposing the overlay on the background video or the background image, and displaying a video image obtained through superimposition, and displaying the background video or the background image when a trigger operation for the region associated with the overlay is detected. The displaying a video image obtained through superimposition may be performed only when a trigger operation for the region associated with the overlay is not detected.

Optionally, the information about the region associated with the overlay and the initial status flag may be located in an overlay control structure. During specific implementation, the information about the region associated with the overlay and the initial status flag may be located in the associated region structure (AssociatedSphereRegionStruct) in the foregoing description.

Optionally, the information about the region associated with the overlay and the initial status flag may be located in a media presentation description (MPD). During specific implementation, the information about the region associated with the overlay and the initial status flag may be attribute information of an overlay descriptor in the MPD. @schemeIdUri of the overlay descriptor may be "urn:mpeg:mpegI:omaf:2018:ovly" in the foregoing description.

Optionally, the method may further include: obtaining trigger type information. The trigger operation for the region associated with the overlay may include a trigger operation, indicated by the trigger type information, for the region associated with the overlay.

During specific implementation, the trigger type information is located in the overlay control structure. For example, the overlay control structure may be the associated region structure (AssociatedSphereRegionStruct) in the foregoing description.

During specific implementation, the trigger type information may alternatively be located in the media presentation description (MPD). During specific implementation, the trigger type information is the attribute information of the overlay descriptor in the MPD. @schemeIdUri of the overlay descriptor may be "urn:mpeg:mpegI:omaf:2018:ovly" in the foregoing description.

Optionally, the method may further include: obtaining a conditional trigger flag, and when a value of the conditional trigger flag is a first preset value, detecting whether there is a trigger operation for the region associated with the overlay. The first preset value of the conditional trigger flag is used to indicate that display or undisplay of the overlay is controlled by using the trigger operation for triggering display or undisplay of the overlay. A second preset value of the conditional trigger flag may be used to indicate that display or undisplay of the overlay is not controlled by using the trigger operation for triggering display or undisplay of the overlay. During specific implementation, the conditional trigger flag is located in the overlay control structure that is used for user interaction control. For example, the overlay control structure may be the overlay control structure (OverlayInteraction) corresponding to the bit index 7 in the foregoing description.

It should be understood that more content related to FIG. 4 has been described in the foregoing description and the Summary, and details are not described herein again.

Figure 5:
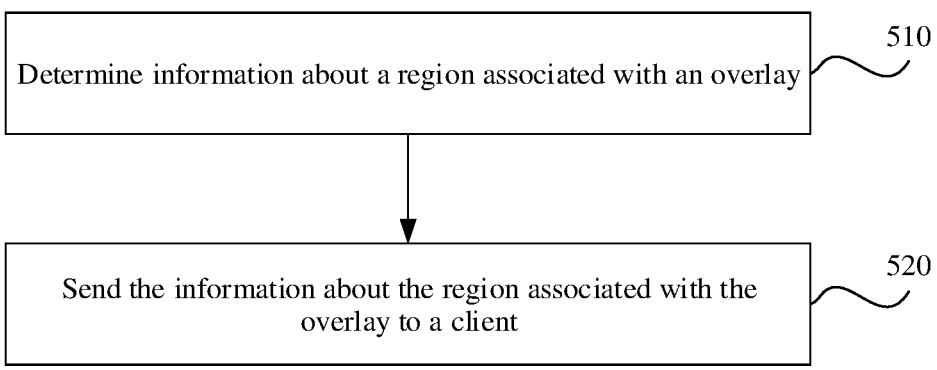
FIG. 5 is a schematic flowchart of a method for processing media data according to an embodiment of this application.

FIG. 5 is a schematic flowchart of a method for processing media data according to an embodiment of this application.

The method shown in FIG. 5 may be performed by a server. The method shown in FIG. 5 may include step 510 and step 520. The following describes step 510 and step 520 in detail.

510: Determine information about a region associated with an overlay, where the information about the region associated with the overlay is used to indicate the region associated with the overlay.

The determining information about a region may be determining, by obtaining a region marked by a user, information about the region. Alternatively, information about a region that may include an object image or a human image may be determined by identifying the object image or the human image that corresponds to the overlay and that is in a background video or a background image.

520: Send the information about the region associated with the overlay to a client.

A trigger operation on the region associated with the overlay is used to control display or undisplay of the overlay. The trigger operation may include: a tapping operation within the region associated with the overlay or a trigger operation that a line of sight of the user is within the region associated with the overlay.

The overlay is a video, an image, or text that is used to be superimposed on the background video or the background image (which may be at least a part of a region on the background video or the background image) for display.

The method may further include: obtaining the overlay, encoding the overlay to obtain bitstream data of the overlay, and sending the bitstream data of the overlay to the client. The overlay may be an image used for an omnidirectional video image.

The method may further include: obtaining the background video or the background image, encoding the background video or the background image to obtain bitstream data of the background video or the background image, and sending the bitstream data of the background video or the background image to the client. The background video or the background image may be an image used for the omnidirectional video image.

Content displayed in the background video or the background image may be a target object, and content of the overlay may be text information of the target object.

Optionally, the information about the region associated with the overlay may be located in an overlay control structure. For example, the overlay control structure may be the associated region structure (AssociatedSphereRegionStruct) in the foregoing description.

Optionally, the information about the region associated with the overlay may alternatively be located in a media presentation description (MPD). During specific implementation, the information about the region associated with the overlay is attribute information of an overlay descriptor in the MPD. @schemeIdUri of the overlay descriptor may be "urn:mpeg:mpegI:omaf:2018:ovly" in the foregoing description.

The information about the region associated with the overlay may include location information of the region associated with the overlay. During specific implementation, the location information of the region associated with the overlay may include location information of a center point of the region associated with the overlay or location information of a top-left corner point of the region associated with the overlay.

The information about the region associated with the overlay may include a width and a height of the region associated with the overlay.

The information about the region associated with the overlay is plane region information or sphere region information.

Optionally, the method may further include: sending trigger type information to the client, where the trigger type information is used to indicate a trigger type of the trigger operation that is used to trigger display or undisplay of the overlay.

During specific implementation, the trigger type information is located in the overlay control structure. For example, the overlay control structure may be the associated region structure (AssociatedSphereRegionStruct) in the foregoing description.

During specific implementation, the trigger type information may alternatively be located in the media presentation description (MPD). During specific implementation, the trigger type information is the attribute information of the overlay descriptor in the MPD. @schemeIdUri of the overlay descriptor may be "urn:mpeg:mpegI:omaf:2018:ovly" in the foregoing description.

Optionally, the method may further include: sending a conditional trigger flag to the client, where a first preset value of the conditional trigger flag is used to indicate that display or undisplay of the overlay is controlled by using the trigger operation for triggering display or undisplay of the overlay.

A second preset value of the conditional trigger flag is used to indicate that display or undisplay of the overlay is not controlled by using the trigger operation for triggering display or undisplay of the overlay.

During specific implementation, the conditional trigger flag is located in the overlay control structure that is used for user interaction control. For example, the overlay control structure may be the overlay control structure (OverlayInteraction) corresponding to the bit index 7 in the foregoing description.

Optionally, the method may further include: sending an initial status flag to the client, where the initial status flag is used to indicate that the overlay is in a displayed state initially or is used to indicate that the overlay is in an undisplayed state initially.

Optionally, the initial status flag may be located in the overlay control structure. During specific implementation, the initial status flag may be located in the associated region structure (AssociatedSphereRegionStruct) in the foregoing description.

Optionally, the initial status flag may be located in the media presentation description (MPD). During specific implementation, the initial status flag may be the attribute information of the overlay descriptor in the MPD. @schemeIdUri of the overlay descriptor may be "urn:mpeg:mpegI:omaf:2018:ovly" in the foregoing description.

It should be understood that more content related to FIG. 5 has been described in the foregoing description and the Summary, and details are not described herein again.

The foregoing describes in detail the method for processing media data in the embodiments of this application with reference to FIG. 3 to FIG. 5. The following describes in detail implementation details in FIG. 3 to FIG. 5 with reference to specific embodiments.

Embodiment 1

In this embodiment, a new overlay control structure required in FIG. 3 to FIG. 5 is defined. A sphere region associated with the overlay is defined in the structure, to indicate a sphere region that is in a background video or a background image and that can be tapped by a user. When detecting that the overlay control structure is present in a bitstream, a client further parses the sphere region defined in the structure, so that display of the overlay associated with the region can be triggered when the user taps the region.

In this embodiment, a new overlay control structure is defined as AssociatedSphereRegionStruct, and specific syntax of AssociatedSphereRegionStruct is as follows.

```
aligned(8) class AssociatedSphereRegionStruct ( ) {
    SphereRegionStruct(1);
}
```

Specific semantics is as follows.

SphereRegionStruct(1) defines a sphere region associated with the overlay. SphereRegionStruct(1) may include information about a region associated with the overlay, where the information about the region associated with the overlay may be sphere region information.

When the foregoing defined sphere region is present in a user's viewport range, depending on a client configuration or a user interface prompt message, the user may trigger, by tapping the region, display or undisplay of the overlay associated with the region.

Steps on a server side are as follows.

Step 1: A server obtains an omnidirectional video bitstream and a corresponding content bitstream of one or more overlays.

Step 2: Perform encapsulation in a video encapsulator (a bitstream encapsulation apparatus) in a video file format. In an OMAF standard file format, the foregoing defined overlay control structure is used to indicate that when the sphere region associated with the overlay is present in the user's viewport range, the user may trigger, by tapping the region, display or undisplay of the overlay associated with the region.

Step 3: Send an encapsulated bitstream to a sending and transmission apparatus, to perform signal transmission.

Steps on the client are as follows.

Step 1: A receiving apparatus obtains an encapsulated bitstream of ominidirectional video content.

Step 2: Send the bitstream to a bitstream decapsulation apparatus, to perform decapsulation and parsing. In this step, the bitstream decapsulation apparatus searches for and parses out the overlay control structure AssociatedSphereRegionStruct, and learns that display or undisplay of the overlay is triggered by the user by tapping the region associated with the overlay.

Step 3: When a display apparatus plays video, the client configuration or the user interface prompt message may include a prompt message indicating that the user can trigger display or undisplay of the overlay.

In this embodiment of the present disclosure, a sphere region is described in a newly-defined overlay control structure, and the sphere region is associated with an overlay. Therefore, the user can tap the sphere region to control display of the overlay associated with the sphere region.

According to this embodiment of the present disclosure, conditional display of the overlay is supported by a newly-added structure definition. Therefore, the user can perform an operation and display in a personalized way.

In this embodiment of the present disclosure, similar to Embodiment 1, a new overlay control structure required in FIG. 3 to FIG. 5 is defined as AssociatedSphereRegion-Struct. In AssociatedSphereRegionStruct, a 2D region (plane region) is defined to indicate that display of an overlay associated with the region is triggered when a user taps the region.

Specific syntax is defined as follows.

```
aligned(8) class AssociatedSphereRegionStruct ( ) {
    2DRegionStruct( );
}
class 2DRegionStruct( ) {
    unsigned int(16) object_x;
    unsigned int(16) object_y;
    unsigned int(16) object_width;
    unsigned int(16) object_height;
}
```

Specific semantics is as follows. 2DRegionStruct( ) defines a two-dimensional region associated with the overlay. 2DRegionStruct( ) may include information about a region associated with the overlay, where the information about the region associated with the overlay may be plane region information.

object_x and object_y may be location information of the region associated with the overlay, and represent a location (x, y) of the top-left corner of the region in two-dimensional coordinates system of background VR stream content (a background video or a background image).

object_width and object_height may be the width and the height of the region associated with the overlay, and represent the width and the height of the region in the two-dimensional coordinates of the background VR stream content.

When the foregoing defined sphere region is present in a user's viewport range, depending on a client configuration or a user interface prompt message, the user may trigger, by tapping the region, display or undisplay of the overlay associated with the region.

For specific operation steps on a server side and a client, refer to Embodiment 1.

According to this embodiment of the present disclosure, the region associated with the overlay is represented by a two-dimensional coordinate system (plane coordinate system).

Embodiment 3

In this embodiment, similar to Embodiment 1, a new overlay control structure is defined. A sphere region associated with the overlay is defined in the structure, to indicate a sphere region that is in a background VR video stream and that can be tapped by a user. When detecting that the overlay control structure is present in a bitstream, a client further parses the sphere region defined in the structure, so that display of the overlay associated with the region can be triggered when the user taps the region. In addition, in the overlay control structure, a flag is defined to indicate an initial state of the overlay, to indicate whether the overlay is displayed by default when the user does not perform any operation.

In this embodiment, a new overlay control structure is defined as AssociatedSphereRegionStruct, and specific syntax of AssociatedSphereRegionStruct is as follows:

```
aligned(8) class AssociatedSphereRegionStruct ( ) {
    unsigned int(8) initial_status;
    SphereRegionStruct(1);
}
```

Specific semantics is as follows.initial_status defines a flag that may be the initial status flag in the foregoing description, to indicate whether the overlay is displayed by default.

SphereRegionStruct(1) defines a sphere region associated with the overlay.

When the foregoing defined sphere region is present in a user's viewport range, depending on a client configuration or a user interface prompt message, the user may trigger, by tapping the region, display or undisplay of the overlay associated with the region.

Alternatively, as shown in Embodiment 2, SphereRegionStruct(1) defined in the overlay control structure AssociatedSphereRegionStruct (may be replaced with 2DRegionStruct( ) defined in Embodiment 2, and syntax of the overlay control structure is defined as follows:

```
aligned(8) class AssociatedSphereRegionStruct ( ) {
    unsigned int(8) initial_status;
    2DRegionStruct( );
}
class 2DRegionStruct( ) {
    unsigned int(16) object_x;
    unsigned int(16) object_y;
    unsigned int(16) object_width;
    unsigned int(16) object_height;
}
```

Specific semantics is as follows.initial_status defines a flag that may be the initial status flag in the foregoing description, to indicate whether the overlay is displayed by default.

2DRegionStruct( ) defines a two-dimensional region associated with the overlay.

object_x and object_y represent a location (x, y) of the top-left corner of the region in two-dimensional coordinates of background VR stream content. object_x and object_y may be location information of the region associated with the overlay, and represent a location (x, y) of the top-left corner of the region in two-dimensional coordinates of background VR stream content (a background video or a background image).

object_width and object_height represent the width and the height of the region in the two-dimensional coordinates of the background VR stream content. object_width and object_height may be the width and the height of the region associated with the overlay, and represent the width and the height of the region in the two-dimensional coordinates of the background VR stream content.

In this embodiment of the present disclosure, a sphere region is described in a newly-defined overlay control structure, and the sphere region is associated with an overlay. Therefore, the user can tap the sphere region to control display of the overlay associated with the sphere region. In addition, a flag is defined in the overlay control structure, to indicate whether the overlay is displayed by default.

According to this embodiment of the present disclosure, conditional display of the overlay is supported by a newly-added structure definition.

Embodiment 4

In this embodiment, similar to Embodiment 1, a new overlay control structure is defined. A sphere region associated with the overlay is defined in the structure, to indicate a sphere region that is in a background VR video stream and that can be tapped by a user. When detecting that the overlay control structure is present in a bitstream, a client further parses the sphere region defined in the structure, so that display of the overlay associated with the region can be triggered when the user taps the region. In addition, a flag is defined in the overlay control structure, to indicate a type of triggering display of the overlay, and a value is defined for the flag to indicate that the trigger type is triggering by user tapping.

In this embodiment, a new overlay control structure is defined as AssociatedSphereRegionStruct, and specific syntax of AssociatedSphereRegionStruct is as follows:

```
aligned(8) class AssociatedSphereRegionStruct ( ) {
    unsigned int(8) condition_type;
    if(condition_type == 0) {
        SphereRegionStruct(1);
    }
}
```

Specific semantics is as follows.condition_type defines a flag that may be the trigger type information in the foregoing description, to indicate a type of triggering display of the overlay.

SphereRegionStruct(1) defines a sphere region associated with the overlay.

It is defined that when a value of condition_type is 0, the trigger type is triggering by user tapping, and other values are reserved. A specific definition is as follows:

| Value | Description |
| --- | --- |
| 0 | The user taps the associated sphere region to trigger display or undisplay of the overlay. |
| 1, . . . , and 255 | Reserved |

When the foregoing defined sphere region is present in a user's viewport range, depending on a client configuration or a user interface prompt message, the user may trigger, by tapping the region, display or undisplay of the overlay associated with the region.

Alternatively, as shown in Embodiment 2, SphereRegionStruct(1) defined in the overlay control structure AssociatedSphereRegionStruct (may be replaced with 2DRegionStruct( ) defined in Embodiment 2, and syntax of the overlay control structure is defined as follows:

```
aligned(8) class AssociatedSphereRegionStruct ( ) {
    unsigned int(8) condition_type;
    if(condition_type == 0) {
        2DRegionStruct( );
    }
}class 2DRegionStruct( ) {
    unsigned int(16) object_x;
```

```
        unsigned int(16) object_y;
        unsigned int(16) object_width;
        unsigned int(16) object_height;
}
```

Specific semantics is as follows.condition_type defines a flag that may be the trigger type information in the foregoing description, to indicate a type of triggering display of the overlay.

2DRegionStruct( ) defines a two-dimensional region associated with the overlay.

object_x and object_y represent a location (x, y) of the top-left corner of the region in two-dimensional coordinates of background VR stream content. object_x and object_y may be location information of the region associated with the overlay, and represent a location (x, y) of the top-left corner of the region in two-dimensional coordinates of background VR stream content (a background video or a background image).

object_width and object_height represent the width and the height of the region in the two-dimensional coordinates of the background VR stream content. object_width and object_height may be the width and the height of the region associated with the overlay, and represent the width and the height of the region in the two-dimensional coordinates of the background VR stream content.

In addition, as shown in Embodiment 3, an initial_status flag may be further added into the overlay control structure AssociatedSphereRegionStruct ( ) defined in this embodiment, to indicate whether the overlay is displayed by default. Specific syntax and semantics are the same as those in Embodiment 3.

In this embodiment of the present disclosure, a sphere region is described in a newly-defined overlay control structure, and the sphere region is associated with an overlay. Therefore, the user can tap the sphere region to control display of the overlay associated with the sphere region. In addition, a flag is defined in the overlay control structure, to indicate a type of triggering display of the overlay.

According to this embodiment of the present disclosure, conditional display of the overlay is supported by a newly-added structure definition.

Embodiment 5

In this embodiment, similar to Embodiment 1, a new overlay control structure is defined. A sphere region associated with the overlay is defined in the structure, to indicate a sphere region that is in a background VR video stream and that can be tapped by a user. When detecting that the overlay control structure is present in a bitstream, a client further parses the sphere region defined in the structure, so that display of the overlay associated with the region can be triggered when the user taps the region. In addition, a flag is defined in an overlay interaction structure (overlay interaction structure), to indicate that display of the overlay is conditionally triggered.

In this embodiment, a new overlay control structure is defined as AssociatedSphereRegionStruct, and specific syntax of AssociatedSphereRegionStruct is as follows:

```
aligned(8) class AssociatedSphereRegionStruct ( ) {
    SphereRegionStruct(1);
}
```

Specific semantics is as follows.SphereRegionStruct(1) defines a sphere region associated with the overlay.

In addition, a flag is defined in the overlay interaction structure (overlay control structure), to indicate that display of the overlay is conditionally triggered.

Specific syntax is as follows:

```
aligned(8) class OverlayInteraction ( ) {
    unsigned int(1) conditional switch on off flag;
}
```

Specific semantics is as follows.conditional_switch_on_off_flag defines a flag that may be the conditional trigger flag in the foregoing description, to indicate that display of the overlay is conditionally triggered.

OverlayInteraction represents the overlay control structure used for user interaction control in the foregoing description.

When the foregoing defined sphere region is present in a user's viewport range, depending on a client configuration or a user interface prompt message, the user may trigger, by tapping the region, display or undisplay of the overlay associated with the region.

Alternatively, as shown in Embodiment 2, SphereRegionStruct(1) defined in the overlay control structure AssociatedSphereRegionStruct (may be replaced with 2DRegionStruct( ) defined in Embodiment 2, and syntax of the overlay control structure is defined as follows:

```
aligned(8) class AssociatedSphereRegionStruct ( ) {
    2DRegionStruct( );
}
}class 2DRegionStruct( ) {
    unsigned int(16) object_x;
    unsigned int(16) object_y;
    unsigned int(16) object_width;
    unsigned int(16) object_height;
}
```

Specific semantics is as follows.2DRegionStruct( ) defines a two-dimensional region associated with the overlay.

object_x and object_y may represent a location (x, y) of the top-left corner of the region in two-dimensional coordinates of background VR stream content. object_x and object_y may be location information of the region associated with the overlay, and represent a location (x, y) of the top-left corner of the region in two-dimensional coordinates of background VR stream content (a background video or a background image).

object_width and object_height may represent the width and the height of the region in the two-dimensional coordinates of the background VR stream content. object_width and object_height may be the width and the height of the region associated with the overlay, and represent the width and the height of the region in the two-dimensional coordinates of the background VR stream content.

In addition, as shown in Embodiment 3, an initial_status flag may be further added into the overlay control structure AssociatedSphereRegionStruct ( ) defined in this embodiment, to indicate whether the overlay is displayed by default. Specific syntax and semantics are the same as those in Embodiment 3.

In this embodiment of the present disclosure, a sphere region is described in a newly-defined overlay control structure, and the sphere region is associated with an overlay. Therefore, the user can tap the sphere region to control display of the overlay associated with the sphere region. In addition, a flag is defined in the overlay interaction structure (overlay interaction structure), to indicate that display of the overlay is conditionally triggered.

According to this embodiment of the present disclosure, conditional display of the overlay is supported by a newly-added structure definition.

Embodiment 6

In this embodiment, a description about a region associated with an overlay is newly added into an MPD, to indicate a sphere region that is in a background VR video stream and that can be tapped by a user. When detecting that the sphere region associated with the overlay is present in the MPD, the client can trigger display of the overlay associated with the region when the user taps the region.

In the OMAF standard, an overlay descriptor has been defined in the MPD, and @schemeIdUri of the overlay descriptor is "urn:mpeg:mpegI:omaf:2018:ovly". At most one such descriptor can be present at an adaptation set level of the MPD, and is used to indicate an overlay associated with the adaptation set.

In this embodiment, the sphere region associated with the overlay is described in the overlay descriptor of the MPD, and specific syntax of the overlay descriptor is as follows:

| Elements and Attributes for OVLY descriptor | Use | Data type | Description |
| --- | --- | --- | --- |
| OverlayInfo | 1 | omaf2:OverlayInfoType | Container element whose sub-element or attribute provides information about the overlay<br>Container element whose sub-elements and attributes provide information about the overlay |
| OverlayInfo.associatedSphereRegion | 1 | omaf2:Overlay AssociatedSphereRegionType | Container element whose sub-element or attribute provides information about the sphere region associated with the overlay<br>Container element whose sub-elements and attributes provide information about the overlay associated sphere region |
| OverlayInfo.associatedSphereRegion@center_azimuth | 0 ... 1 | Xs:int | Indicates an azimuth value of the center point of the sphere region associated with the overlay. If the region is dynamic, the value indicates an initial azimuth value of the center point of the sphere region; otherwise, the value indicates an azimuth value of the center point of the static region. When OverlayInfo.associatedSphereRegion is present but a value of OverlayInfo.associatedSphereRegion@center_azimuth is not present, the value is 0 by default. |
| OverlayInfo.associatedSphereRegion@center_elevation | 0 ... 1 | Xs:int | Indicates an elevation value of the center point of the sphere region associated with the overlay. If the region is dynamic, the value indicates an initial elevation value of the center point of the sphere region; otherwise, the value indicates an elevation value of the center point of the static region. When |

| Elements and Attributes for OVLY descriptor | Use | Data type | Description |
|---|---|---|---|
| OverlayInfo.associatedSphereRegion@ | 0...1 | Xs:int | OverlayInfo.associatedSphereRegion is present but a value of OverlayInfo.associatedSphereRegion@center_elevation is not present, the value is 0 by default. Indicates a tilt value of the center point of the sphere region associated with the overlay. If the region is dynamic, the value indicates an initial tilt value of the center point of the sphere region; otherwise, the value indicates a tilt value of the center point of the static region. When OverlayInfo.associatedSphereRegion is present but a value of OverlayInfo.associatedSphereRegion@center_tilt is not present, the value is 0 by default. |
| OverlayInfo.associatedSphereRegion@azimuth_range | 1 | Xs:int | Indicates an azimuth value range formed when the sphere region associated with the overlay passes through the center point. |
| OverlayInfo.associatedSphereRegion@elevation_range | 1 | Xs:int | Indicates an elevation value range formed when the sphere region associated with the overlay passes through the center point. | depending on a client configuration or a user interface prompt message, the user may trigger, by tapping the region, display or undisplay of the overlay associated with the region.

OverlayInfo.associatedSphereRegion@center_azimuth,
OverlayInfo.associatedSphereRegion@center_elevation,
OverlayInfo.associatedSphereRegion@center_tilt,
OverlayInfo.associatedSphereRegion@azimuth_range, and
OverlayInfo.associatedSphereRegion@elevation_range
  may be the information about the region associated with the overlay in the foregoing description, where the information about the region associated with the overlay may be sphere region information.
OverlayInfo.associatedSphereRegion@center_azimuth,
OverlayInfo.associatedSphereRegion@center_elevation, and
OverlayInfo.associatedSphereRegion@center_tilt may be the location information of the region associated with the overlay in the foregoing description.
OverlayInfo.associatedSphereRegion@azimuth_range and
OverlayInfo.associatedSphereRegion@elevation_range
  may be respectively the width and the height of the region associated with the overlay.

In this embodiment of the present disclosure, a sphere region is described in an overlay descriptor of an MPD, and the sphere region is associated with an overlay. Therefore, the user can tap the sphere region to control display of the overlay associated with the sphere region.

According to this embodiment of the present disclosure, conditional display of the overlay is supported by a newly-added structure definition.

Embodiment 7

In this embodiment, a description about a region associated with an overlay is newly added into an MPD, to indicate a two-dimensional region that is in a background VR video stream and that can be tapped by a user. When detecting that the two-dimensional region associated with the overlay is present in the MPD, the client can trigger display of the overlay associated with the region when the user taps the region.

In the OMAF standard, an overlay descriptor has been defined in the MPD, and @schemeIdUri of the overlay descriptor is "urn:mpeg:mpegI:omaf:2018:ovly". At most one such descriptor can be present at an adaptation set level of the MPD, and is used to indicate an overlay associated with the adaptation set.

In this embodiment, the two-dimensional region associated with the overlay is described in the overlay descriptor of the MPD, and specific syntax of the overlay descriptor is as follows:

| Elements and Attributes for OVLY descriptor | Use | Data type | Description |
|---|---|---|---|
| OverlayInfo | 1 | omaf2:Overlay InfoType | Container element whose sub-element or attribute provides information about the overlay<br>Container element whose sub-elements and attributes provide information about the overlay |
| OverlayInfo.associated2DRegion | 1 | omaf2:Overlay Associated2D-RegionType | Container element whose sub-element or attribute provides information about the two-dimensional region associated with the overlay<br>Container element whose sub-elements and attributes provide information about the overlay associated 2D region |
| OverlayInfo.associated2DRegion@object_x | 0 . . . 1 | Xs:int | Indicates an x value, of the top-left corner of the two-dimensional region associated with the overlay, in two-dimensional coordinates. If the region is dynamic, the value indicates an initial x value, of the top-left corner of the two-dimensional region, in the two-dimensional coordinates; otherwise, the value indicates an x value, of the top-left corner of the static region, in the two-dimensional coordinates.<br>When OverlayInfo.associated2DRegion is present but a value of OverlayInfo.associated2DRegion@object_x is not present, the value is 0 by default. |
| OverlayInfo.associated2DRegion@object_y | 0 . . . 1 | Xs:int | Indicates a y value, of the top-left corner of the two-dimensional region associated with the overlay, in two-dimensional coordinates. If the region is dynamic, the value indicates an initial y value, of the top-left corner of the two-dimensional region, in the two-dimensional coordinates; otherwise, the value indicates a y value, of the top-left corner of the static region, in the two-dimensional coordinates.<br>When OverlayInfo.associated2DRegion is present but a value of OverlayInfo.associated2DRegion@object_y is not present, the value is 0 by default. |
| OverlayInfo.associated2DRegion@object width | 1 | Xs:int | Indicates a width value, of the two-dimensional region associated with the overlay, in the two-dimensional coordinates. If the region is dynamic, the value indicates an initial width value, of the two-dimensional region, in the two-dimensional coordinates; otherwise, the value indicates a width value, of the static region, in the two-dimensional coordinates. |
| OverlayInfo.associaetd2DRegion@object height | 1 | Xs:int | Indicates a height value, of the two-dimensional region associated with the overlay, in the two-dimensional coordinates. If the region is dynamic, the value indicates an initial height value, of the two-dimensional region, in the two-dimensional coordinates; otherwise, the value indicates a height value, of the static region, in the two-dimensional coordinates. |

When the foregoing defined sphere region is present in a user's viewport range, depending on a client configuration or a user interface prompt message, the user may trigger, by tapping the region, display or undisplay of the overlay associated with the region.

OverlayInfo.associated2DRegion@object_x, OverlayInfo.associated2DRegion@object_x, OverlayInfo.associated2DRegion@object_width, and OverlayInfo.associated2DRegion@object_height may be the information about the region associated with the overlay in the foregoing description, where the information about the region associated with the overlay may be plane region information.

OverlayInfo.associated2DRegion@object_x and OverlayInfo.associated2DRegion@object_x may be location information of the region associated with the overlay, and represent a location (x, y) of the top-left corner of the region in two-dimensional coordinates of background VR stream content (a background video or a background image). OverlayInfo.associated2DRegion@object_width and OverlayInfo.associated2DRegion@object_height may be the width and the height of the region associated with the overlay, and represent the width and the height of the region in the two-dimensional coordinates of the background VR stream content.

In this embodiment of the present disclosure, a two-dimensional region is described in an overlay descriptor of an MPD, and the two-dimensional region is associated with an overlay. Therefore, the user can tap the two-dimensional region to control display of the overlay associated with the two-dimensional region.

According to this embodiment of the present disclosure, conditional display of the overlay is supported by a newly-added structure definition.

Embodiment 8

In this embodiment, a description about a default status of an overlay is newly added into an MPD.

In the OMAF standard, an overlay descriptor has been defined in the MPD, and @schemeIdUri of the overlay descriptor is "urn:mpeg:mpegI:omaf:2018:ovly". At most one such descriptor can be present at an adaptation set level of the MPD, and is used to indicate an overlay associated with the adaptation set.

In this embodiment, a flag indicating whether the overlay is displayed in the default status is described in the overlay descriptor of the MPD, and specific syntax of the flag is as follows:

| Elements and Attributes for OVLY descriptor | Use | Data type | Description |
| --- | --- | --- | --- |
| OverlayInfo | 1 | omaf2:OverlayInfoType | Container element whose sub-element or attribute provides information about the overlay Container element whose sub-elements and attributes provide information about the overlay |
| OverlayInfo@ initial_status | 0 . . . 1 | Xs:int | Indicates whether the overlay is displayed by default. When this field is not present, the overlay is displayed by default. |

In this embodiment of the present disclosure, a flag is described in an overlay descriptor of an MPD, and the flag indicates whether the overlay is displayed in a default status. OverlayInfo @initial_status is the initial status flag in the foregoing description.

According to this embodiment of the present disclosure, conditional display of the overlay is supported by a newly-added structure definition.

Embodiment 9

In this embodiment, a description about a type of triggering display of an overlay is newly added into an MPD.

In the OMAF standard, an overlay descriptor has been defined in the MPD, and @schemeIdUri of the overlay descriptor is "urn:mpeg:mpegI:omaf:2018:ovly". At most one such descriptor can be present at an adaptation set level of the MPD, and is used to indicate an overlay associated with the adaptation set.

In this embodiment, a flag indicating the type of triggering display of the overlay is described in the overlay descriptor of the MPD, and specific syntax of the flag is as follows:

| Elements and Attributes for OVLY descriptor | Use | Data type | Description |
| --- | --- | --- | --- |
| OverlayInfo | 1 | omaf2:OverlayInfoType | Container element whose sub-element or attribute provides information about the overlay Container element whose sub-elements and attributes provide information about the overlay. |
| OverlayInfo@ condition_type | 0 . . . 1 | Xs:int | Indicates the type of triggering display of the overlay. When the value is 0, it indicates that display of the overlay is triggered by a user by tapping a sphere region or a two-dimensional region that is associated with the overlay. |

In this embodiment of the present disclosure, a flag is described in an overlay descriptor of an MPD, and the flag indicates a type of triggering display of the overlay. OverlayInfo @condition_type is the trigger type information in the foregoing description.

According to this embodiment of the present disclosure, conditional display of the overlay is supported by a newly-added structure definition.

Embodiment 10

In this embodiment, a description about an overlay is newly added into the MMT protocol.

In this embodiment, an overlay descriptor is newly added into the MMT protocol, and a sphere region or a two-dimensional region that is associated with the overlay is described in the descriptor. Specific syntax of the overlay descriptor is as follows:

| Syntax | Value | No. of bits | Mnemonic |
| --- | --- | --- | --- |
| VR_information_descriptor( ) { | | | |
| descriptor_tag | | 16 | uimsbf |
| descriptor_length | | 8 | uimsbf |
| rwfp_flag | | 1 | bslbf |
| srqr_flag | | 1 | bslbf |
| 2dqr_flag | | 1 | bslbf |
| overlay_info_flag | | 1 | bslbf |
| reserved | '1 1111' | 4 | bslbf |
| ProjectionFormatStruct( ) | | | |
| Initial ViewingOrientationSample( ) | | | |
| ContentCoverageStruct( ) | | | |
| if(rwfp_flag == 1) { | | | |
|   Region WisePackingStruct( ) | | | |
| } | | | |
| if(srqr_flag == 1) { | | | |
|   SphereRegionQualityRankingBox( ) | | | |
| } | | | |
| if(2dqr_flag == 1) { | | | |
|   2DRegionQualityRankingBox( ) | | | |
| } | | | |
| if(overlay_info_flag == 1) { | | | |
|   AssociatedSphereRegionStruct( ) | | | |
| } | | | |

Specific syntax of AssociatedSphereRegionStruct( ) is as follows:

```
aligned(8) class AssociatedSphereRegionStruct ( ) {
    SphereRegionStruct(1);
}
```

Specific syntax of AssociatedSphereRegionStruct( ) is as follows:

```
aligned(8) class AssociatedSphereRegionStruct ( ) {
    SphereRegionStruct(1);
}
```

Specific semantics is as follows.SphereRegionStruct(1) defines a sphere region associated with the overlay. SphereRegionStruct(1) may include information about a region associated with the overlay, where the information about the region associated with the overlay may be sphere region information.

Alternatively, similar to Embodiment 2, a two-dimensional region may be defined in AssociatedSphereRegionStruct), and specific syntax of AssociatedSphereRegionStruct( ) is defined as follows:

```
aligned(8) class AssociatedSphereRegionStruct ( ) {
    2DRegionStruct( );
}
    class 2DRegionStruct( ) {
    unsigned int(16) object_x;
    unsigned int(16) object_y;
    unsigned int(16) object_width;
    unsigned int(16) object_height;
}
```

Specific semantics is as follows.2DRegionStruct( ) defines a two-dimensional region associated with the overlay. 2DRegionStruct( ) may include information about a region associated with the overlay, where the information about the region associated with the overlay may be plane region information. Details are as follows.object_x and object_y represent a location (x, y) of the top-left corner of the region in two-dimensional coordinates of background VR stream content. object_x and object_y may be location information of the region associated with the overlay, and represent a location (x, y) of the top-left corner of the region in two-dimensional coordinates of background VR stream content (a background video or a background image).

object_width and object_height represent the width and the height of the region in the two-dimensional coordinates of the background VR stream content. object_width and object_height may be the width and the height of the region associated with the overlay, and represent the width and the height of the region in the two-dimensional coordinates of the background VR stream content.

When the foregoing defined sphere region is present in a user's viewport range, depending on a client configuration or a user interface prompt message, the user may trigger, by tapping the region, display or undisplay of the overlay associated with the region.

In this embodiment of the present disclosure, a region associated with an overlay is described in the MMT protocol, so that a user can tap the region to control display of the region associated with the overlay.

According to this embodiment of the present disclosure, conditional display of the overlay is supported by a newly-added structure definition.

An embodiment of the present disclosure provides a client. The client may be the client described above, or the client may include some components or modules of the client described above. The client may include an obtaining module and a display module. Operations performed by the modules in the client may be implemented by using software, or may be implemented as software modules in a memory of the client that are to be invoked and executed by a processor. The operations performed by the modules in the client may alternatively be implemented by using a hardware chip.

It should be understood that, for more implementation details of the operations performed by the modules of the client in this embodiment, refer to the related descriptions in the foregoing method embodiments and the Summary. Details are not described herein again.

An embodiment of the present disclosure provides a server. The server may be the server described above, or the server may include some components or modules of the server described above. The server may include a determining module and a sending module. Operations performed by the modules in the server may be implemented by using software, or may be implemented as software modules in a memory of the server that are to be invoked and executed by a processor. The operations performed by the modules in the server may alternatively be implemented by using a hardware chip.

It should be understood that, for more implementation details of the operations performed by the modules of the server in this embodiment, refer to the related descriptions in the foregoing method embodiments and the Summary. Details are not described herein again.

Figure 6:
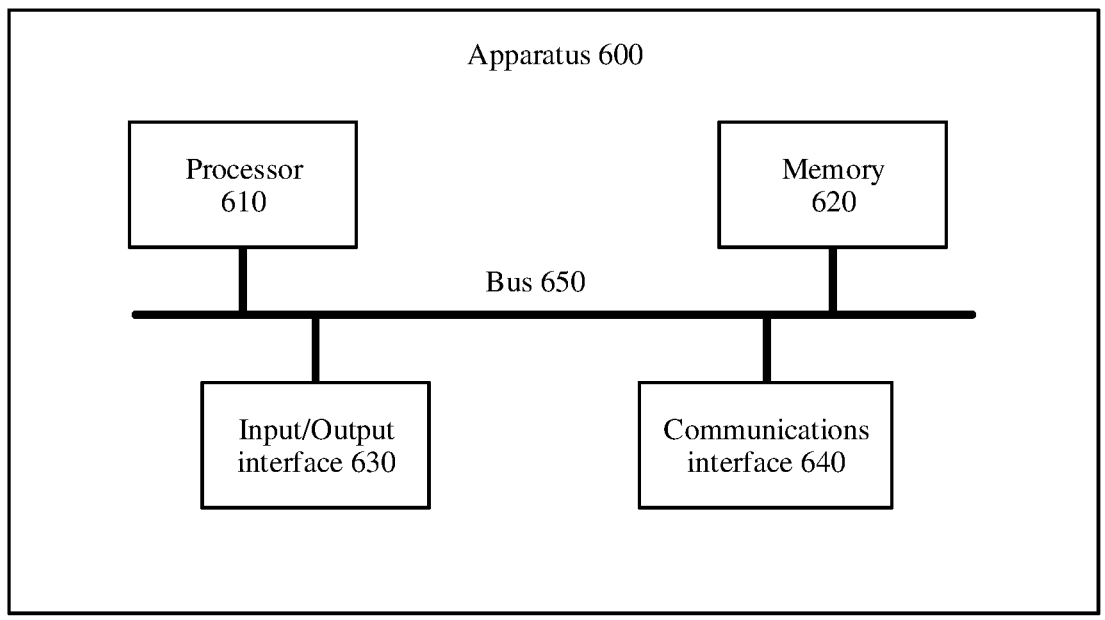
FIG. 6 is a schematic structural diagram of an electronic apparatus according to an embodiment of the present disclosure.

FIG. 6 is a schematic structural diagram of hardware of an apparatus for processing media data (an electronic apparatus) according to an embodiment of this application. The apparatus 600 shown in FIG. 6 may be considered as a computer device. The apparatus 600 may be used as an implementation of the client or the server in the embodiments of this application, or may be used as an implementation of a media data transmission method in the embodiments of this application. The apparatus 600 may include a processor —610, a memory 620, an input/output interface 630, and a bus 650, and may further include a communications interface 640. The processor 610, the memory 620, the input/output interface 630, and the communications interface 640 implement a communication connection to each other through the bus 650.

The processor 610 may be a general-purpose central processing unit (CPU), a microprocessor, an application-specific integrated circuit (ASIC), or one or more integrated circuits. The processor 610 is configured to execute a related program to implement functions that need to be executed by modules in the client or the server in the embodiments of this application, or to perform the media data transmission method in the method embodiments of this application. The processor 610 may be an integrated circuit chip and has a signal processing capability. During implementation, steps in the foregoing methods can be implemented by using a hardware integrated logic circuit in the processor 610, or by using instructions in a form of software. The processor 610 may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor 610 may implement or perform the methods, the steps, and logical block diagrams that are disclosed in the embodiments of this application. The general-purpose processor may be a microprocessor, or the processor may be any conventional processor or the like. Steps of the methods disclosed with reference to the embodiments of this application may be directly performed and accomplished by a hardware decoding processor, or may be performed and accomplished by a combination of hardware and software modules in a decoding processor. The software module may be located in a mature storage medium in the art, such as a random access memory, a flash memory, a read-only memory, a programmable read-only memory, an electrically erasable programmable memory, or a register. The storage medium is located in the memory 620. The processor 610 reads information in the memory 620, and implements, in combination with hardware of the processor 610, the functions that need to be executed by the modules that may be included in the client or the server in the embodiments of this application, or performs the media data transmission method in the method embodiments of this application.

The memory 620 may be a read-only memory (ROM), a static storage device, a dynamic storage device, or a random access memory (RAM). The memory 620 may store an operating system and another application program. When the functions that need to be executed by the modules that may be included in the client or the server in the embodiments of this application are implemented or the media data transmission method in the method embodiments of this application is performed by using software or firmware, program code used to implement the technical solutions provided in the embodiments of this application is stored in the memory 620, and the processor 610 performs operations that need to be performed by the modules that may be included in the client or the server, or performs the media data transmission method provided in the method embodiments of this application.

The input/output interface 630 is configured to receive input data and information, and output data such as an operation result.

The communications interface 640 implements communication between the apparatus 600 and another device or a communications network by using a transceiver apparatus such as, but not limited to, a transceiver. The communications interface 640 may be used as an obtaining module or a sending module in a processing apparatus.

The bus 650 may include a path, for transmitting information between the components (for example, the processor 610, the memory 620, the input/output interface 630, and the communications interface 640) of the apparatus 600.

It should be noted that, although only the processor 610, the memory 620, the input and output interface 630, the communications interface 640, and the bus 650 of the apparatus 600 are shown in FIG. 6, during specific implementation, a person skilled in the art should understand that the apparatus 600 may further include another device required for implementing normal running, for example, may further include a display that is configured to display to-be-played video data. In addition, based on a specific requirement, a person skilled in the art should understand that the apparatus 600 may further include hardware components for implementing other additional functions. In addition, a person skilled in the art should understand that the apparatus 600 may alternatively include only components required for implementing this embodiment of this application, but not necessarily include all the components shown in FIG. 6.

Figure 7:
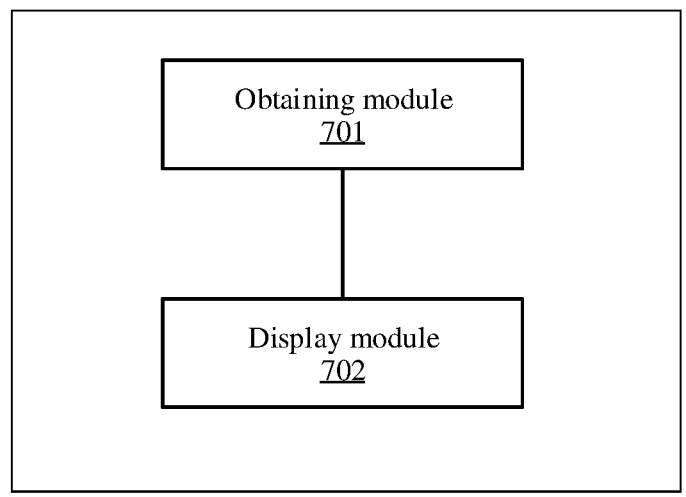
FIG. 7 is a schematic block diagram of a client according to an embodiment of the present disclosure.

Referring to FIG. 7, a client 700 is provided. The client 700 may be an implementation of the foregoing apparatuses. The client 700 may include an obtaining module 701 and a display module 702.

The obtaining module 701 may be configured to obtain an overlay and information about a region associated with the overlay, where the information about the region associated with the overlay is used to indicate the region associated with the overlay.

The obtaining module 701 may be the communications interface 640, the input/output interface 630, or the receiving apparatus in the foregoing description.

The display module 702 may be configured to display the overlay when a trigger operation for the region associated with the overlay is detected.

The display module 702 may be the display or the display apparatus in the foregoing description.

The trigger operation for the region associated with the overlay may include: a tapping operation within the region associated with the overlay or a trigger operation that a line of sight of a user is within the region associated with the overlay.

The information about the region associated with the overlay may be located in an overlay control structure.

The information about the region associated with the overlay may include location information of the region associated with the overlay.

The information about the region associated with the overlay may include the width and the height of the region associated with the overlay.

The information about the region associated with the overlay may be plane region information or sphere region information.

In some feasible implementations, the obtaining module 701 may be further configured to obtain trigger type information. The trigger operation for the region associated with the overlay may include a trigger operation, indicated by the trigger type information, for the region associated with the overlay. The trigger type information may be located in the overlay control structure.

The trigger type information may be located in a media presentation description (MPD). In some feasible implementations, the trigger type information may be attribute information of an overlay descriptor in the MPD.

In some feasible implementations, the obtaining module 701 may be further configured to obtain a conditional trigger flag. The client 700 may further include a detection module, configured to: when a value of the conditional trigger flag is a first preset value, detect whether there is a trigger operation for the region associated with the overlay. The conditional trigger flag may be located in the overlay control structure that is used for user interaction control.

The information about the region associated with the overlay may be located in the media presentation description (MPD). In some feasible implementations, the information about the region associated with the overlay may be the attribute information of the overlay descriptor in the MPD.

It may be understood that, a function of each module of the client 700 in this embodiment may be implemented according to the method in the foregoing method embodiments. For a specific implementation process, refer to the related descriptions in the foregoing method embodiments. Details are not described herein again.

Figure 8:
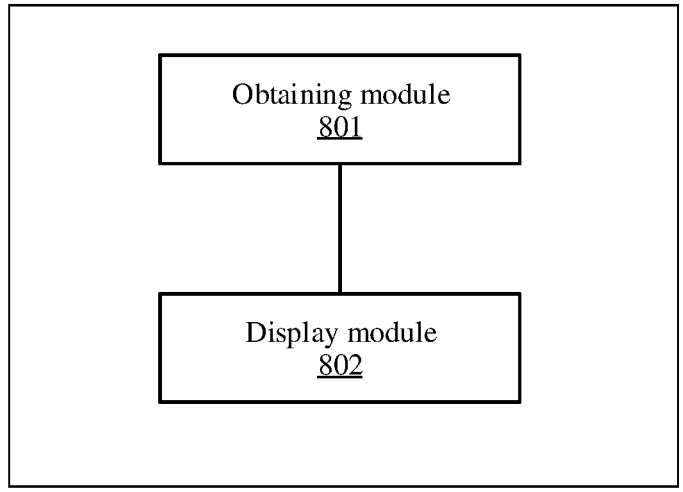
FIG. 8 is a schematic block diagram of a client according to an embodiment of the present disclosure.

Referring to FIG. 8, a client 800 is provided. The client 800 may be an implementation of the foregoing apparatuses. The client 800 may include an obtaining module 801 and a display module 802.

The obtaining module 801 may be configured to obtain an overlay, a background video or a background image, and information about a region associated with the overlay, where the information about the region associated with the overlay is used to indicate the region associated with the overlay, and obtain an initial status flag.

The obtaining module 801 may be the communications interface 640, the input/output interface 630, or the receiving apparatus in the foregoing description.

The display module 802 may be configured to: when a value of the initial status flag indicates that the overlay is undisplayed by default, perform the following operations: displaying the background video or the background image, and when a trigger operation for the region associated with the overlay is detected, superimposing the overlay on the background video or the background image, and displaying a video image obtained through superimposition. The displaying the background video or the background image may be performed only when a trigger operation for the region associated with the overlay is not detected.

The trigger operation for the region associated with the overlay may include a tapping operation within the region associated with the overlay. The display module 802 may be further configured to: when the value of the initial status flag indicates that the overlay is undisplayed by default, display prompt information indicating whether to display the overlay by using the tapping operation within the region associated with the overlay.

The display module 802 may be the display or the display apparatus in the foregoing description.

The displaying prompt information indicating whether to display the overlay by using the tapping operation within the region associated with the overlay may be performed only when it is detected that at least a part of the region associated with the overlay is within a current user's viewport range.

The information about the region associated with the overlay and the initial status flag may be located in an overlay control structure.

The information about the region associated with the overlay and the initial status flag may be located in a media presentation description (MPD). In some feasible implementations, the information about the region associated with the overlay and the initial status flag may be attribute information of an overlay descriptor in the MPD.

In some feasible implementations, the obtaining module 801 may be further configured to obtain trigger type information. The trigger operation for the region associated with the overlay may include a trigger operation, indicated by the trigger type information, for the region associated with the overlay.

The trigger type information may be located in the overlay control structure.

The trigger type information may be located in the media presentation description (MPD). In some feasible implementations, the trigger type information may be the attribute information of the overlay descriptor in the MPD.

The obtaining module 801 may be further configured to obtain a conditional trigger flag. The client may further include a detection module, configured to: when a value of the conditional trigger flag is a first preset value, detect whether there is a trigger operation for the region associated with the overlay.

The conditional trigger flag may be located in the overlay control structure that is used for user interaction control.

It may be understood that, a function of each module of the client 800 in this embodiment may be implemented according to the method in the foregoing method embodiments. For a specific implementation process, refer to the related descriptions in the foregoing method embodiments. Details are not described herein again.

Figure 9:
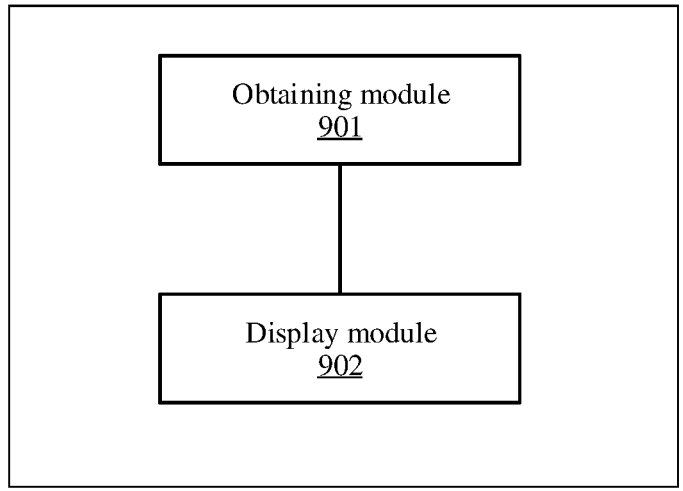
FIG. 9 is a schematic block diagram of a client according to an embodiment of the present disclosure.

Referring to FIG. 9, a client 900 is provided. The client 900 may be an implementation of the foregoing apparatuses. The client 900 may include an obtaining module 901 and a display module 902.

The obtaining module 901 may be configured to obtain an overlay, a background video or a background image, and information about a region associated with the overlay, where the information about the region associated with the overlay is used to indicate the region associated with the overlay, and obtain an initial status flag.

The obtaining module 901 may be the communications interface 640, the input/output interface 630, or the receiving apparatus in the foregoing description.

The display module 902 may be configured to: when a value of the initial status flag indicates that the overlay is displayed by default, perform the following operations, including superimposing the overlay on the background video or the background image, and displaying a video image obtained through superimposition, and displaying the background video or the background image when a trigger operation for the region associated with the overlay is detected. The displaying a video image obtained through superimposition may be performed only when a trigger operation for the region associated with the overlay is not detected.

The trigger operation for the region associated with the overlay may include a tapping operation within the region associated with the overlay. The display module 902 may be further configured to: when the value of the initial status flag indicates that the overlay is displayed by default, display prompt information indicating whether to undisplay the overlay by using the tapping operation within the region associated with the overlay.

The display module 902 may display the prompt information indicating whether to undisplay the overlay by using the tapping operation within the region associated with the overlay, only when it is detected that at least a part of the region associated with the overlay is within a current user's viewport range.

The display module 902 may be the display or the display apparatus in the foregoing description.

The information about the region associated with the overlay and the initial status flag may be located in an overlay control structure.

The information about the region associated with the overlay and the initial status flag may be located in a media presentation description (MPD). In some feasible implementations, the information about the region associated with the overlay and the initial status flag may be attribute information of an overlay descriptor in the MPD.

In some feasible implementations, the obtaining module 901 may be further configured to obtain trigger type information. The trigger operation for the region associated with the overlay may include a trigger operation, indicated by the trigger type information, for the region associated with the overlay.

The trigger type information may be located in the overlay control structure.

The trigger type information may be located in the media presentation description (MPD). In some feasible implementations, the trigger type information may be the attribute information of the overlay descriptor in the MPD.

In some feasible implementations, the obtaining module 901 may be further configured to obtain a conditional trigger flag. The client may further include a detection module, configured to: when a value of the conditional trigger flag is a first preset value, detect whether there is a trigger operation for the region associated with the overlay.

The conditional trigger flag may be located in the overlay control structure that is used for user interaction control.

It may be understood that, a function of each module of the client 900 in this embodiment may be implemented according to the method in the foregoing method embodiments. For a specific implementation process, refer to the related descriptions in the foregoing method embodiments. Details are not described herein again.

Figure 10:
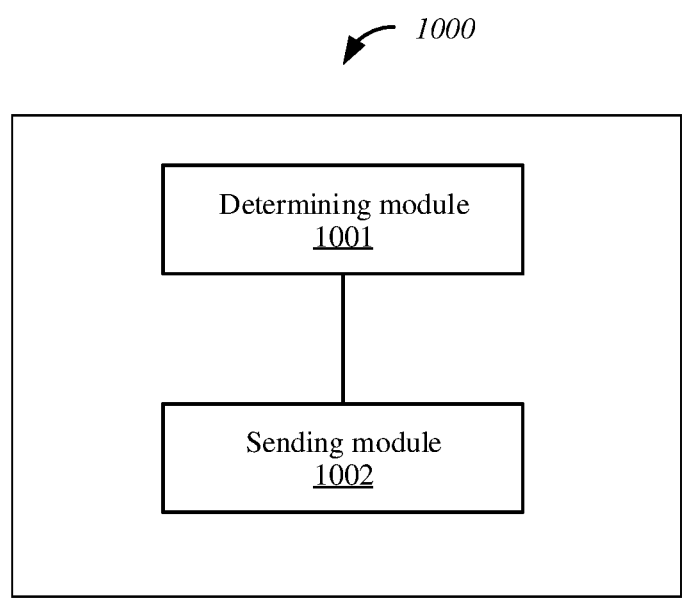
FIG. 10 is a schematic block diagram of a server according to an embodiment of the present disclosure.

Referring to FIG. 10, a server 1000 is provided. The server 700 may be an implementation of the foregoing apparatuses. The server 1000 may include a determining module 1001 and a sending module 1002.

The determining module 1001 may be configured to determine information about a region associated with an overlay, where the information about the region associated with the overlay is used to indicate the region associated with the overlay.

The sending module 1002 may be configured to send the information about the region associated with the overlay to a client.

The sending module 1002 may be the sending and transmission apparatus, the communications interface 640, or the input/output interface 630 in the foregoing description.

The information about the region associated with the overlay may be located in an overlay control structure.

The information about the region associated with the overlay may include location information of the region associated with the overlay.

The information about the region associated with the overlay may include the width and the height of the region associated with the overlay.

The information about the region associated with the overlay may be plane region information or sphere region information.

The sending module may be further configured to send trigger type information to the client, where the trigger type information is used to indicate a trigger type of a trigger operation that is used to trigger display or undisplay of the overlay.

The trigger type information may be located in the overlay control structure.

The trigger type information may be located in a media presentation description (MPD). In some feasible implementations, the trigger type information may be attribute information of an overlay descriptor in the MPD.

In some feasible implementations, the sending module 1002 may be further configured to send a conditional trigger flag to the client, where a first preset value of the conditional trigger flag is used to indicate that display or undisplay of the overlay is controlled by using the trigger operation for triggering display or undisplay of the overlay.

A second preset value of the conditional trigger flag may be used to indicate that display or undisplay of the overlay is not controlled by using the trigger operation for triggering display or undisplay of the overlay.

The conditional trigger flag may be located in the overlay control structure that is used for user interaction control.

The information about the region associated with the overlay may be located in the media presentation description (MPD). In some feasible implementations, the information about the region associated with the overlay may be the attribute information of the overlay descriptor in the MPD.

In some feasible implementations, the sending module 1002 may be further configured to send an initial status flag to the client, where the initial status flag is used to indicate that the overlay is in a displayed state initially or is used to indicate that the overlay is in an undisplayed state initially.

The initial status flag may be located in the overlay control structure.

The initial status flag may be located in the media presentation description (MPD). In some feasible implementations, the initial status flag may be the attribute information of the overlay descriptor in the MPD.

It may be understood that, a function of each module of the server 1000 in this embodiment may be implemented according to the method in the foregoing method embodiments. For a specific implementation process, refer to the related descriptions in the foregoing method embodiments. Details are not described herein again.

All or a part of the modules of the foregoing devices may be software modules, and the processor reads the software modules to perform related methods, or may be units in a chip. This is not limited herein.

A person of ordinary skill in the art may be aware that, in combination with the examples described in the embodiments disclosed in this specification, units and algorithm steps may be implemented by electronic hardware or a combination of computer software and electronic hardware. Whether the functions are executed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or all or a part of the technical solutions may be implemented in a form of a software product. The computer software product is stored in a storage medium and may include several instructions for instructing a computer device (which may be a personal computer, a server, a network device, or the like) to perform all or a part of the steps of the methods described in the embodiments of this application. The foregoing storage medium may include any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for processing media data, comprising:
receiving an omnidirectional bitstream, wherein the omnidirectional bitstream comprises an overlay control structure of omnidirectional media format (OMAF), wherein the overlay control structure comprises an associated region structure (AssociatedSphereRegionStruct) indicating information about a region associated with an overlay, wherein the omnidirectional bitstream further comprises, in the overlay control structure, trigger type information for the region associated with the overlay, wherein the trigger type information comprises information describing a trigger operation that is one of an action of a user or a state of a user, and wherein the information about the region associated with the overlay is sphere region information;
obtaining, the overlay and the information about the region associated with the overlay, wherein the information about the region associated with the overlay indicates the region associated with the overlay; and
displaying the overlay in response to the trigger operation for the region associated with the overlay being detected, wherein the trigger operation on the region associated with the overlay is caused by a user and used to control display or undisplay of the overlay.

2. The method according to claim 1, wherein the trigger operation for the region associated with the overlay comprises at least one of a tapping operation within the region associated with the overlay or a trigger operation associated with a line of sight of a user being within the region associated with the overlay.

3. The method according to claim 1, wherein the information about the region associated with the overlay comprises location information of the region associated with the overlay.

4. The method according to claim 1, wherein the information about the region associated with the overlay comprises information indicating a width and a height of the region associated with the overlay.

5. The method according to claim 1, further comprising:
obtaining the trigger type information;
wherein the trigger operation for the region associated with the overlay is indicated by the trigger type information.

6. The method according to claim 1, further comprising:
obtaining a conditional trigger flag; and
detecting whether a trigger operation for the region associated with the overlay exists in response to a value of the conditional trigger flag being a first preset value.

7. The method according to claim 6, wherein the conditional trigger flag is disposed in the overlay control structure that is used for user interaction control.

8. A client, comprising:
a display;
at least one processor; and
a non-transitory computer readable medium, the non-transitory computer readable medium having a program stored thereon for execution by the at least one processor, the program including instructions to:
receive an omnidirectional bitstream, wherein the omnidirectional bitstream comprises an overlay control structure of omnidirectional media format (OMAF), wherein the overlay control structure comprises an associated region structure (AssociatedSphereRegionStruct) indicating information about a region associated with an overlay, wherein the omnidirectional bitstream further comprises, in the overlay control structure, trigger type information for the region associated with the overlay, wherein the trigger type information comprises information describing a trigger operation that is one of an action of a user or a state of a user, and wherein the information about the region associated with the overlay is sphere region information;
obtain the overlay and information about the region associated with the overlay, wherein the information about the region associated with the overlay indicates the region associated with the overlay; and
cause the display to display the overlay in response to the trigger operation for the region associated with the overlay being detected, wherein the trigger operation on the region associated with the overlay is caused by a user and used to control display or undisplay of the overlay.

9. The client according to claim 8, wherein the trigger operation for the region associated with the overlay comprises at least one of a tapping operation within the region associated with the overlay or a trigger operation associated with a line of sight of a user being within the region associated with the overlay.

10. The client according to claim 8, wherein the information about the region associated with the overlay comprises location information of the region associated with the overlay.

11. The client according to claim 8, wherein the information about the region associated with the overlay comprises information indicating a width and a height of the region associated with the overlay.

* * * * *